US005620384A

United States Patent [19]
Kojima et al.

[11] Patent Number: 5,620,384
[45] Date of Patent: Apr. 15, 1997

[54] FRONT DERAILLEUR FOR A BICYCLE

[75] Inventors: Satoru Kojima; Naohiro Nishimoto, both of Sakai, Japan

[73] Assignee: Shimano, Inc., Osaka, Japan

[21] Appl. No.: 564,402

[22] Filed: Nov. 29, 1995

Related U.S. Application Data

[62] Division of Ser. No. 337,861, Nov. 14, 1994, Pat. No. 5,496,222.

[30] Foreign Application Priority Data

| Nov. 12, 1993 | [JP] | Japan | 5-60911 U |
| Nov. 12, 1993 | [JP] | Japan | 5-283358 |
| Nov. 12, 1993 | [JP] | Japan | 5-283359 |
| Apr. 22, 1994 | [JP] | Japan | 6-84217 |
| Apr. 22, 1994 | [JP] | Japan | 6-84218 |

[51] Int. Cl.⁶ ............................................. F16H 59/00
[52] U.S. Cl. ................................. 474/82; 474/123
[58] Field of Search .................... 474/123, 78–82; 280/236, 238

[56] References Cited

U.S. PATENT DOCUMENTS

| 4,199,998 | 4/1980 | Isobe | 74/217 |
| 4,226,130 | 10/1980 | Isobe | 474/82 |
| 4,330,137 | 5/1982 | Nagano | 280/238 |
| 4,424,048 | 1/1984 | Shimano | 474/82 |
| 4,486,182 | 12/1984 | Coue | 474/78 X |
| 4,887,990 | 12/1989 | Bonnard | 474/80 X |
| 5,037,355 | 8/1991 | Kobayashi | 474/82 |
| 5,312,301 | 5/1994 | Kobayashi | 474/80 |

FOREIGN PATENT DOCUMENTS

| 2346204 | 10/1977 | France | B62M 24/04 |
| 2-16955 | 2/1986 | Japan | B62M 9/12 |

Primary Examiner—Roger J. Schoeppel
Attorney, Agent, or Firm—James A. Deland

[57] ABSTRACT

A front derailleur for a bicycle has a four-point link mechanism, and a control cable is attached by a screw to an end of a connecting arm fixed to one link of the four-point link mechanism. The connecting arm has an auxiliary projection. The control cable applies a torque to the link at a point of contact between the control cable and the auxiliary projection. The screw on the connecting arm is spaced from a chain guide which contacts a chain, to facilitate an operation to attach the control cable to the connecting arm.

18 Claims, 16 Drawing Sheets

5,620,384

FRONT DERAILLEUR FOR A BICYCLE

This is a division of application Ser. No. 08/337,861, filed Nov. 14, 1994, now U.S. Pat. No. 5,496,222.

BACKGROUND OF THE INVENTION

1. Field of the Invention

The present invention relates to a front derailleur for a bicycle, and more particularly to a connection between the front derailleur and a control cable.

2. Description of the Related Art

Generally, a front derailleur includes a fixed section fixed to a bicycle frame, and a movable section supported to be movable relative to the fixed section. The movable section supports a chain guide having a pair of vertical surfaces for contacting a chain.

The movable section is movable relative to the fixed section by pulling a shift control cable. The movable section and fixed section usually are interconnected through pivotal links. The control cable is connected to one of the pivotal links to apply a torque thereto, thereby to swing the link to move the movable section. The control cable is fixed to the link in such a position that an operating force applied to the control cable is converted into a link swinging torque efficiently. However, in a front derailleur having the fixed section disposed below the movable section, in particular, the above-noted position is not necessarily suited for an operation to attach the control cable to the pivotal link.

SUMMARY OF THE INVENTION

The object of the present invention is to provide a front derailleur having means to convert an operating force of a control cable efficiently into a torque for swinging a pivotal link, with the control cable connected to the pivotal link in a position suited for an attaching operation although the fixed section is disposed below the movable section.

The above object is fulfilled, according to the present invention, by a front derailleur a fixed section fixed to a bicycle frame, a chain guide for contacting a chain to shift the chain, a movable section disposed above the fixed section and fixedly supporting the chain guide, and a first and a second links disposed between and pivotally connected to the fixed section and the movable section. The first and second links relatively movably connect the movable section to the fixed section. This front derailleur further comprises a cable connector fixed to the first link for securing a control cable, and an auxiliary projection extending from the cable connector for contacting the control cable in a position substantially spaced from the cable connector.

In the above construction, the cable connector is disposed in a position to facilitate a cable attaching operation. Besides, a force for swinging the first link is applied to the auxiliary projection in a position spaced from the wire connector, thereby realizing application of a strong torque.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

Figure 1:
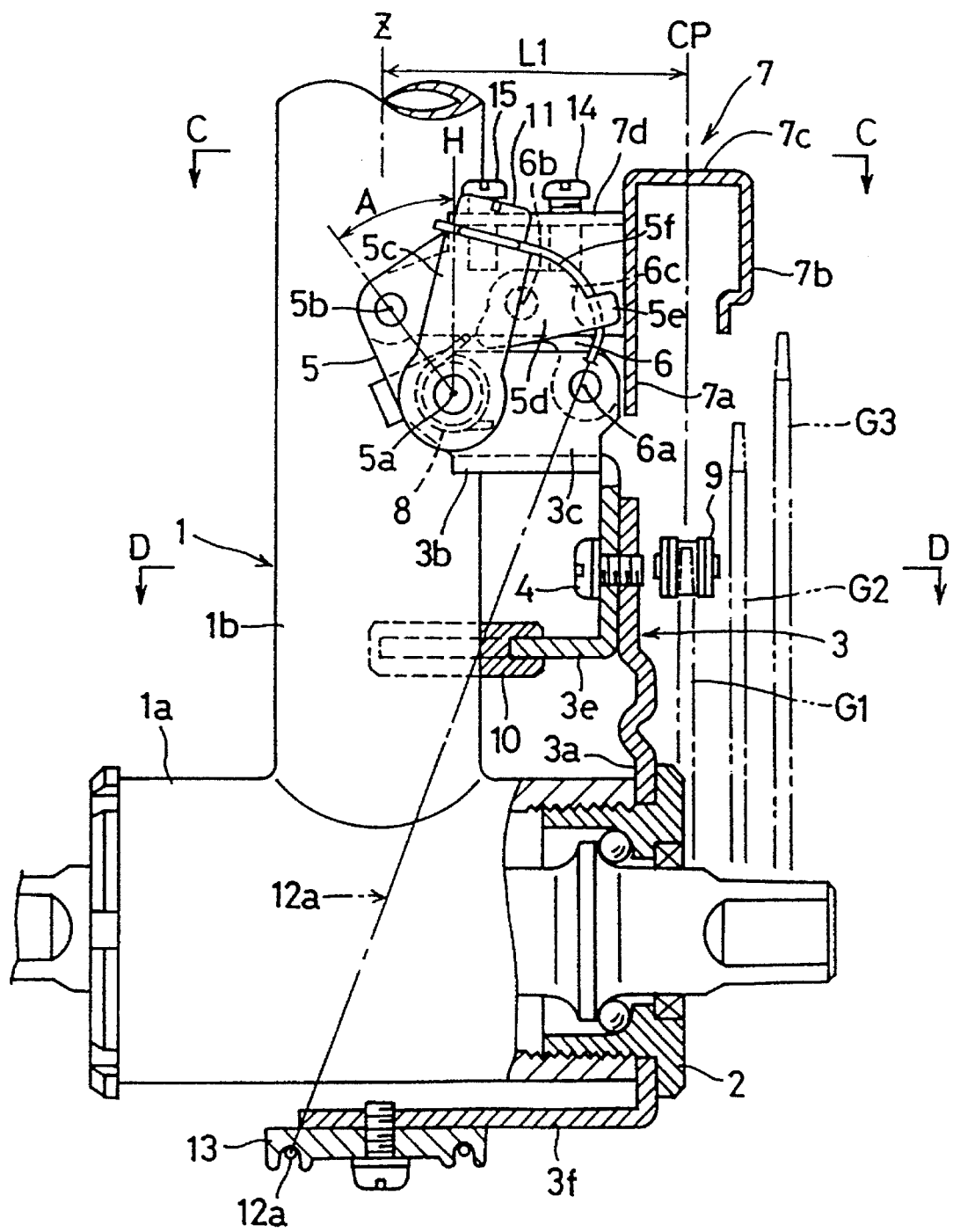
FIG. 1 is a view, partly in section, of a principal portion of a front derailleur according to the present invention.
Figure 2:
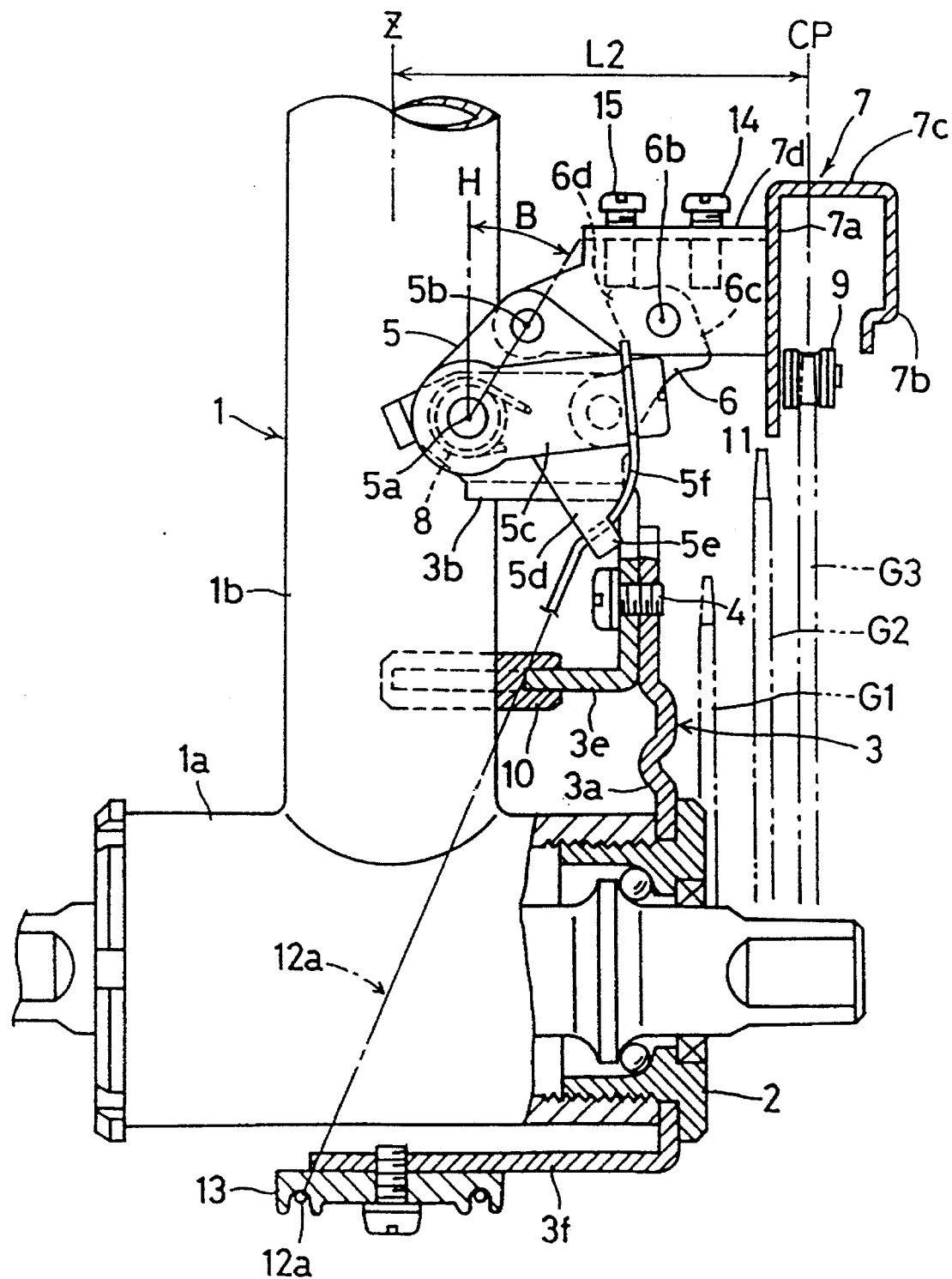
FIG. 2 is a view similar to FIG. 1 and showing the front derailleur in a different position.
Figure 3:
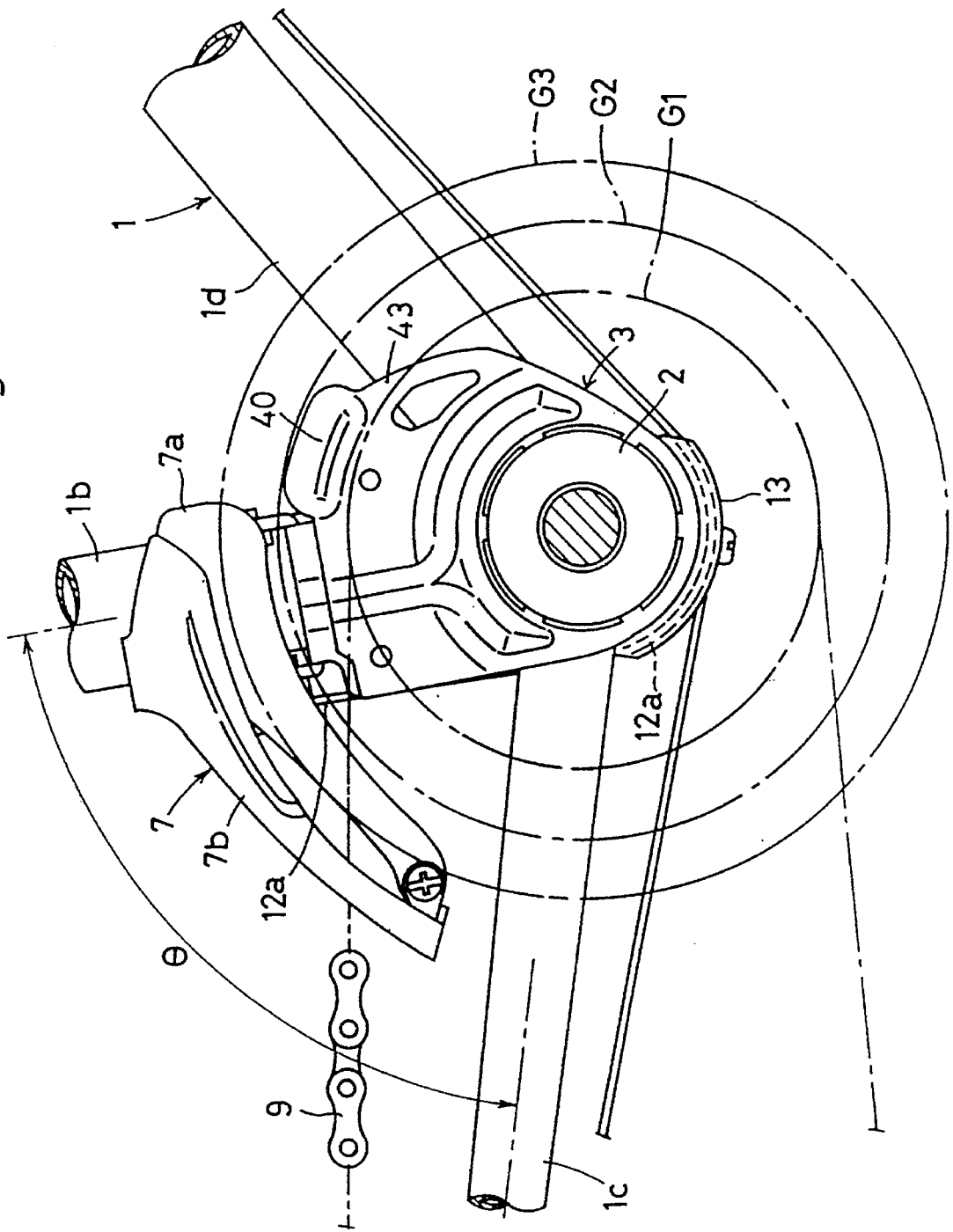
FIG. 3 is a side view of the front derailleur.

A front derailleur according to the present invention will be described with reference to the drawings. FIGS. 1 through 3 show a principal portion of a first embodiment of the present invention.

As used herein, the terms forward direction, rearward direction, upward direction, downward direction and transverse direction refer to those directions of a bicycle to which this front derailleur is attached. FIG. 1 shows a bicycle frame 1 including a vertically extending portion called a seat tube 1b. A direction from chainwheels G1–G3 toward the seat tube 1b is called herein an inward direction, and a direction from the seat tube 1b toward chainwheels G1–G3 an outward direction.

The bicycle frame 1 also includes a bottom bracket 1a. Numeral 2 denotes a clamp screw for attaching a crank assembly. A mounting bracket 3a is attached to the bottom bracket 1 a by the clamp screw 2.

The mounting bracket 3a, and a support member 3b connected to an upper position of the mounting bracket 3a by mounting screws 4, constitute a fixed member 3. A movable member 7 having a chain guide is connected to the fixed member 3 through a pair of pivotal links 5 and 6. The chain guide includes a pair of parallel shifter plates 7a and 7b, and an upper surface 7c. A return spring 8 is mounted in a proximal end of one of the pivotal links 5. The return spring 8 has one leg thereof fixed to the support member 3b, and the other leg fixed to the pivotal link 5. Thus, the return spring 8 biases the pivotal link 5 in the inward direction of the bicycle.

Figure 4:
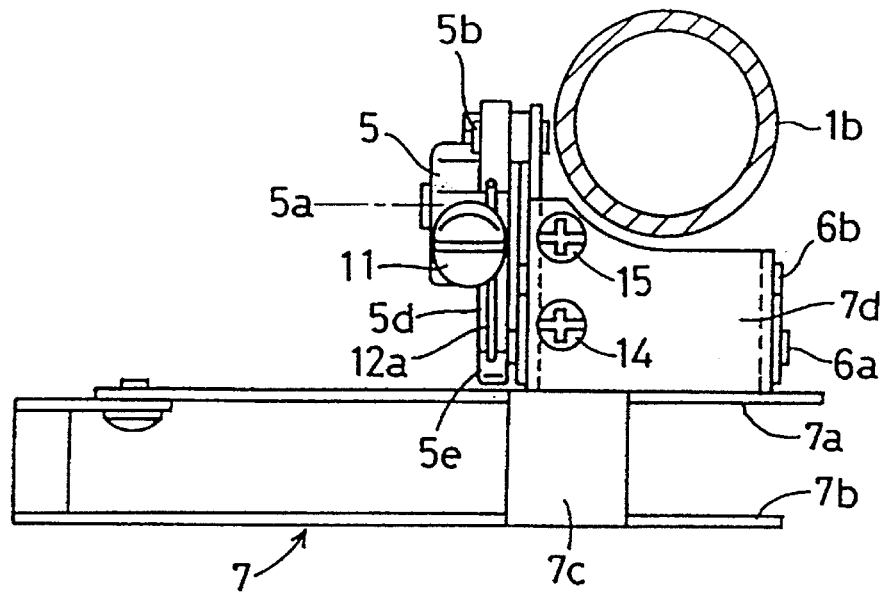
FIG. 4 is a section taken at C in FIG. 1.
Figure 6:
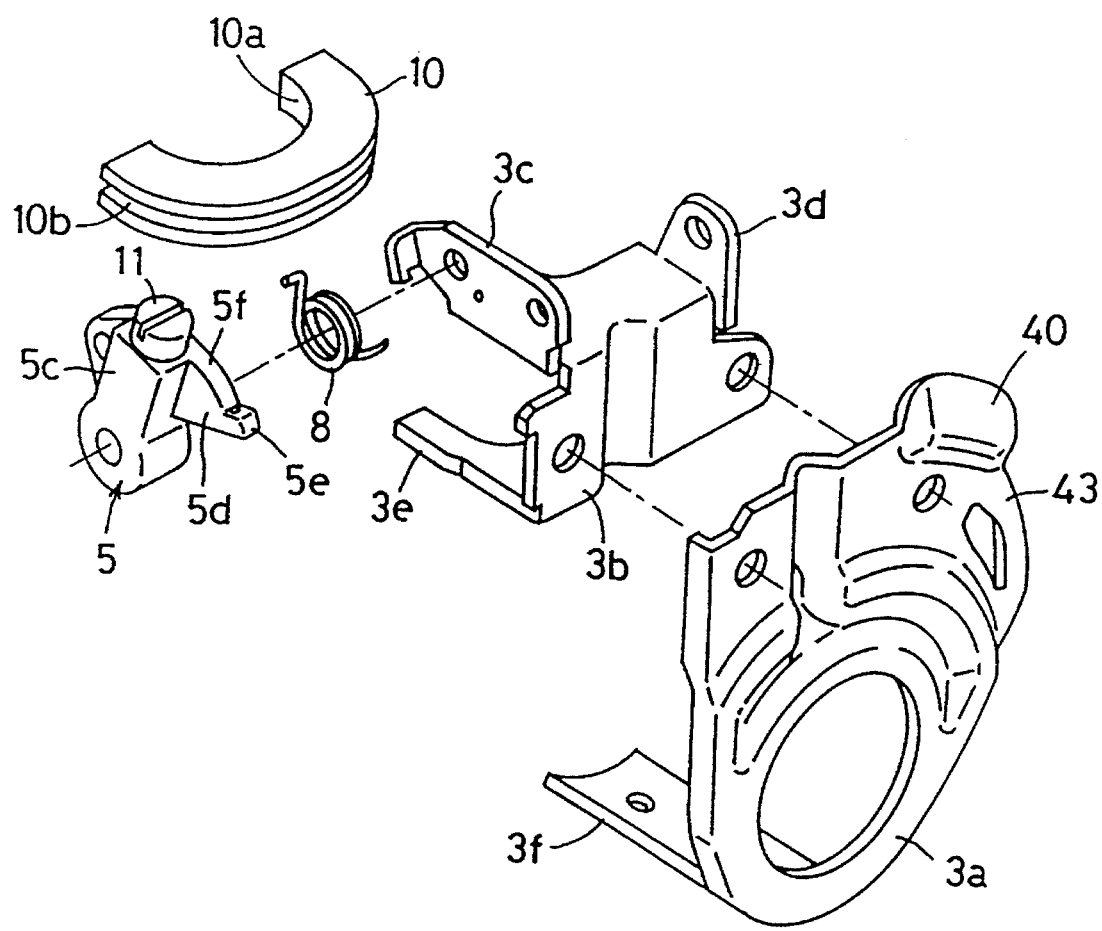
FIG. 6 is an exploded perspective view of a mounting bracket and adjacent component of a front derailleur according to the present invention.

As noted above, the movable member 7 is supported by the pivotal links 5 and 6 to be movable relative to the fixed member 3. As shown in FIG. 6, a pair of link supports 3c and 3d are formed integral with the support member 3b by press working. The pivotal link 5 is pivotally connected at a lower end thereof to one of the supports 3c to be pivotable about a first pivotal axis 5a extending longitudinally of the bicycle. An upper end of this pivotal link 5 is connected to one 7c of a pair of connecting portions 7c and 7d of the movable member 7 as shown in FIG. 4, to be pivotable relative to each other about a second pivotal axis 5b. This second pivotal axis 5b extends substantially parallel to the first pivotal axis 5a.

A lower end of the pivotal link 6 is connected to the connecting portion 3d to be pivotable about a third pivotal axis 6a extending longitudinally of the bicycle. An upper end of the pivotal link 6 is connected to the connecting portion 7d to be pivotable relative to each other about a fourth pivotal axis 6b extending substantially parallel to the third pivotal axis 6a.

A distance from the first pivotal axis 5a to the second pivotal axis 5b of the movable member 7 is substantially the same as a distance from the third pivotal axis 6a to the fourth pivotal axis 6b of the movable member 7. A spacing between the first and third pivotal axes 5a and 6a is substantially the same as a spacing between the second and fourth pivotal axes 5b and 6b. As shown in FIG. 1, the first and third pivotal axes 5a and 6a are disposed below the second and fourth pivotal axes 5b and 6b. Thus, the fixed member 3, movable member 7 and the pair of pivotal links 5 and 6 constitute a substantially parallel four-point link mechanism. The fixed member 3 acts as a lower fixed link, and the movable member 7 as an upper movable link. When the pivotal links 5 and 6 pivot relative to the fixed member 3, the movable member 7 moves transversely relative to the bicycle frame 1 while maintaining a substantially fixed posture relative to the chainwheels G1–G3 and a chain 9.

With the movable member 7 disposed above the fixed member 3 as described above, the pair of pivotal links 5 and 6 as well as the movable member 7 are substantially concealed by the shifter plate 7a of the movable member 7. That is, as seen from FIG. 3, the pivotal links 5 and 6 and the portion 7d of the movable member 7 substantially overlap the shifter plate 7a when seen in a direction perpendicular to the shifter plate 7a. When seen transversely of the bicycle, these components are arranged in a position essentially not projecting above the upper surface 7c of the chain guide, but concealed by the shifter plate 7a. By positioning the movable member 7 above the fixed member 3 in this way, the front derailleur may be formed compact.

As seen from FIG. 4, the first and second pivotal axes 5a and 5b are substantially shorter than the third and fourth pivotal axes 6a and 6b. This arrangement is made to prevent the pivotal link 5 from interfering with the seat tube 1b. That is, the pivotal link 5, in its home position, is disposed to overlap the seat tube 1b as seen from the front of the bicycle. This results in a size reduction of the front derailleur transversely of the bicycle, contributing toward compactness of the front derailleur.

Figure 5:
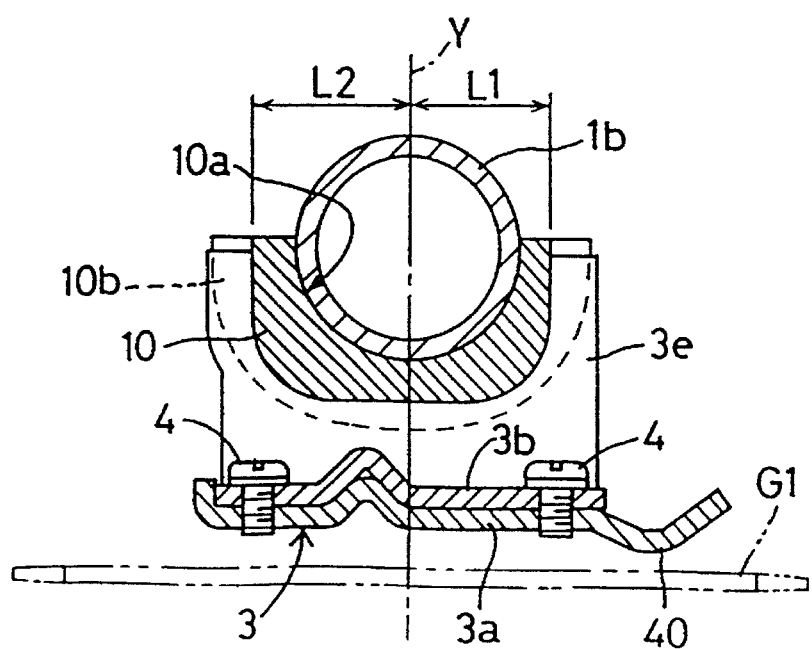
FIG. 5 is a section taken at D in FIG. 1.

A region of the mounting bracket 3a will be described next. The fixed member 3 is fixed to the bicycle frame I by clamping the mounting bracket 3a to the bottom bracket 1a. As shown in FIGS. 5 and 6, a C-shaped plastic clamp 10 is attached to a bifurcate proximal end 3e of the support member 3b, and this clamp 10 is placed in engagement with the seat tube 1b of the bicycle frame 1. The clamp 10 acting as a contact, by engagement with the seat tube 1b, positions and locks the fixed member 3 against rotation about a crank axis relative to the bicycle frame 1. Consequently, the movable member 7 and chainwheels G1–G3 are in a positional relationship around a rotational axis of the chainwheels suited for a shifting operation, and this positional relationship is maintained irrespective of a shifting operation.

As shown in FIG. 5, the clamp 10 has a surface 10a shaped to correspond to an outer surface of the seat tube 1b to contact the seat tube 1b. Usually the seat tube 1b is cylindrical, and hence the surface 10a is also cylindrical. The clamp 10 has a slit 10b formed in a side thereof opposite from the surface 10a to receive the proximal end 3e. As seen from FIG. 5, different distances are provided from front and rear inner surfaces of the slit 10b to a centerline Y of the contact surface 10a. That is, a distance L1 from the centerline Y to the front inner surface of the slit 10b is different from a distance L2 from the centerline Y to the rear inner surface of the slit 10b. The position of the fixed member 3 relative to the bicycle frame is variable by switching the clamp 10 between a first position to receive the proximal end 3e as shown in FIG. 5 and a second position vertically reversed therefrom to receive the proximal end 3e.

An angle 0 between the seat tube 1b and chain stay 1c, as shown in FIG. 3, is variable with the type of bicycle. In a road racer, this angle is 66 to 69 degrees, a mean value being about 68 degrees. A mountain bike has an angle of 63 to 66, with a mean value at about 64 degrees. There is a difference of about 4 degrees between the two bicycles. If the fixed member 3 is set to a uniform position relative to the seat tube 1b, the position of the chain guide 7 relative to the front chainwheels would be different for a different type of bicycle. Thus, the chain guide 7 could always not be placed in a desired position.

The distances L1 and L2 are set to different values to solve the above problem. This construction is adapted to the road racer, for example, when the clamp 10 is fitted with the side of shorter distance L1 directed forward to receive the proximal end 3e, and to the mountain bike when the clamp is fitted with the side of longer distance L2 directed forward. In this way, the chain guide 7 may always be placed in a desired position regardless of the types of bicycle. A plurality of clamps 10 having contact surfaces 10a of varied radii of curvature may be made available, and one of them may be selected to suit a seat tube 1b having a different diameter.

Thus, the clamp 10 and the proximal portion 3e extending toward the seat tube 1b constitute a rotation stopper.

Figure 7A:
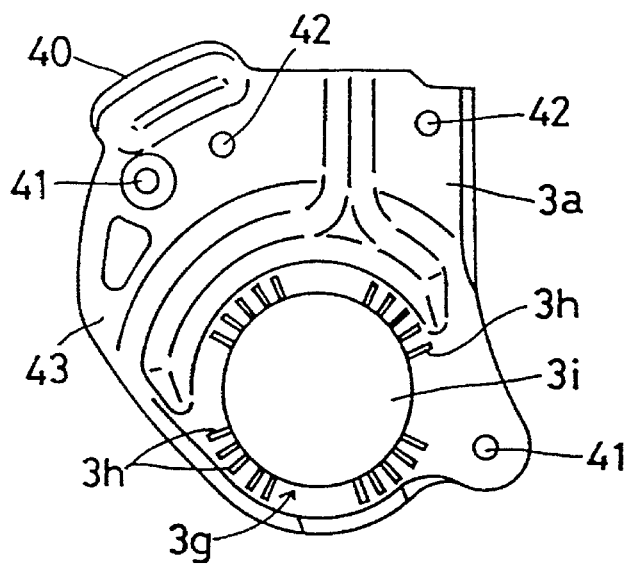
FIG. 7A is a plan view of the mounting bracket.
Figure 7B:
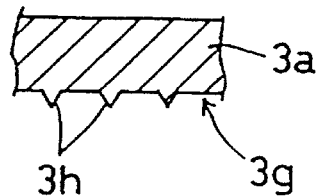
FIG. 7B is a fragmentary sectional view showing radial projections.

As shown in FIGS. 1 and 6, the fixed member 3 has a lower end thereof extending to the bettom bracket 1a. As noted hereinbefore, the fixed member 3 includes the mounting bracket 3a connected to the bottom bracket 1a, and the support member 3b connected to an upper position of the mounting bracket 3a by mounting screws 4. As shown in FIGS. 7A and 7B, the mounting bracket 3a has a contact surface 3g for contacting the bottom bracket 1a. The contact surface 3g has a plurality of ridges 3h formed integral therewith and extending radially of a perforation 3i. These ridges 3h, when pressed against an end surface of the bottom bracket 1a, act to prohibit relative movement between the mounting bracket 3a and bottom bracket 1a. These ridges 3h have the following further function. The end surface of the bottom bracket 1a is designed to extend vertically, but may not be precisely vertical. In such a case, when the mounting bracket 3a is placed in contact with the bottom bracket 1a and the clamp screw 2 is tightened, part of the ridges 3h first contacting the clamp screw 2 are crushed since the bottom bracket 1a has a horizontal female screw though its end surface may not be vertical. As a result, the mounting bracket 3a is always attached in vertical posture to the bottom bracket 1a even if the end surface of the bottom bracket 1a is not vertical.

As shown in FIG. 1, the pivotal link 5 includes an arm portion 5c having a wire connecting screw 11 for connecting an inner wire 12a of a control cable extending from a shaft lever device (not shown).

As shown in FIGS. 1 and 6, the mounting bracket 3a has a guide support 3f extending from a lower end thereof toward a position under the bottom bracket 1a. A wire guide 13 is attached to the guide support 3f to support the inner wire 12a and guide it toward the pivotal link 5. Thus, the wire guide 13 supports the inner wire 12a to be smoothly slidable. The wire guide 13 and pivotal link 5 are supported by the same fixed member 3, so that a relative position between the wire guide 13 and pivotal link 5 is defined with high precision.

When the inner wire 12a connected to the pivotal link 5 is pulled, its operating force causes the pivotal links 5 and 6 to pivot outwardly of the bicycle relative to the fixed member 3 to move the movable member 7 outwardly. Then, the inner one 7a of the pair of shifter plates 7a and 7b presses the chain 9 and changes the chain 9 from the small chainwheel G1 to the intermediate chainwheel G2 or from the intermediate chainwheel G2 to the large chainwheel G3. When the inner wire 12a is relaxed, the pivotal links 5 and 6, under the elastic restoring force of the return spring 8, pivot inwardly of the bicycle relative to the fixed member 3 to move the movable member 7 inwardly. Then, the outer one 7b of the pair of shifter plates 7a and 7b presses the chain 9 and changes the chain 9 from the large chainwheel G3 to the intermediate chainwheel G2 or from the intermediate chainwheel G2 to the small chainwheel G1.

As seen in FIG. 1, the arm portion 5c is formed integral with the pivotal link 5. The wire connecting screw 11 provided at a distal end of the arm portion 5c is disposed in a position to facilitate connection of the wire 12a to the wire connecting screw 11. The arm portion 5c includes an auxiliary projection 5d formed integral therewith and projecting away from the seat tube 1b. As shown in FIG. 1, the auxiliary projection 5d has a gently curved upper surface 5f to guide the wire 12a to a distal end 5e of the auxiliary projection 5d. Thus, the wire 12a contacts the pivotal link 5 to apply a torque thereto, in the region of the distal end 5e substantially spaced from the wire connecting screw 11. When the wire 12a is pulled to operate the front derailleur, the pulling force is applied to the distal end 5e of the auxiliary projection 5d rather than the wire connecting screw 11. In this embodiment, therefore, the pulling force is more effectively used as a torque, compared with the case of its application to the wire connecting screw 11. Further, this wire connecting screw 11 is disposed away from the chain guide 7 to facilitate a wire fixing operation.

The wire 12a is fixed to the front derailleur in the following sequence. First, the front derailleur is attached to the bottom bracket 1a by fixing the mounting bracket 3a in position. At this time, the front derailleur is fixed in position relative to the front chainwheels G1–G3. Subsequently, one end of the inner wire 12a is placed in engagement with the distal end 5e of the auxiliary projection 5d, the wire 12a is stretched along the upper surface 5f, and the end of the wire 12a is fixed to the arm portion 5c with the wire connecting screw 11. The wire 12a may be fixed while the four-point link mechanism is swung toward the seat tube 1b by the return spring 8 as shown in FIG. 1. Alternatively, the wire 12a may be fixed while the four-point link mechanism is swung away from the seat tube 1b by the return spring 8 as shown in FIG. 2.

Figure 8:
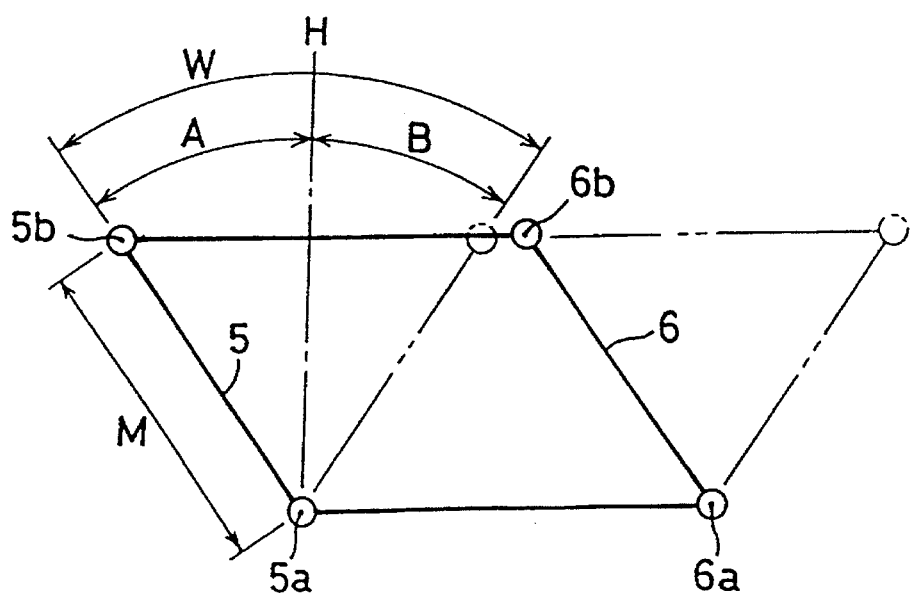
FIG. 8 is a schematic view of a four-point link mechanism for moving a chain guide.

When, as shown in FIG. 1, a center position CP between the shifter plates 7a and 7b is at a distance L1 of about 39 mm from an axis Z of the seat tube 1b, the movable member 7 is in a low speed position to engage the chain 9 with the small chainwheel G1. When, as shown in FIG. 2, the center position CP is at a distance L2 of about 53 mm from the axis Z of the seat tube 1b, the movable member 7 is in a high speed position to engage the chain 9 with the large chainwheel G3. With the front derailleur assembled to the bicycle frame 1, the pivotal link 5 is operable as shown in FIG. 8 to effect shifting operations.

It is assumed that the pivotal link 5 extends vertically when a phantom line extending through the first pivotal axis 5a and second pivotal axis 5b coincides with a vertical line H. The movable member 7 is in the high speed position when the pivotal link 5 has pivoted to one side of the vertical line H, i.e. to a large wheel side tilt position at an angle B outwardly of the bicycle from the vertical line H. The movable member 7 is in the low speed position when the pivotal link 5 has pivoted to the other side of the vertical line H, i.e. to a small wheel side tilt position at an angle A inwardly of the bicycle from the vertical line H, the angle A being larger than the angle B.

The small chainwheel G1 and large chainwheel G3 may be at distances other than 39 mm and 53 mm, respectively, from the axis Z of the seat tube 1b by reason of manufacture or the like. In this case, a pair of adjusting screws 14 and 15 attached to the pivotal link 6, as shown in FIG. 1, are turned to adjust limits of the pivotal movement of the pivotal link 6 relative to the movable member 7. These limits are determined by contact between the adjusting screws 14 and 15 and contact portions 6c and 6d of the pivotal link 6, respectively. In this way, stroke ends of the movable member 7 are adjusted according to a spacing between the chainwheels G1–G3 and the axis Z of the seat tube 1b. This allows the front derailleur to be attached to the bicycle such that the movable member 7 is in the low speed position with the center position CP lying at a distance other than 39 mm from the axis Z of the seat tube 1b, and in the high speed position with the center position CP lying at a distance other than 53 mm from the axis Z of the seat tube 1b. Depending on the distances of the chainwheels G1 and G3 from the axis Z of the seat tube 1b, the large wheel side tilt angle B and small wheel side tilt angle A may be equalized, or the large wheel side tilt angle B may be larger than the small wheel side tilt angle A. In a bicycle having the three, large, intermediate and small size chainwheels G1-G3, generally, the center of the small chainwheel G1 is at a distance of 39 mm from the axis Z of the seat tube 1b, and the center of the large chainwheel G3 is at a distance of 53 from the axis Z of the seat tube 1b. Thus, the pivotal link 5 is operable through a pivoting range W (see FIG. 8) between the large wheel side tilt position and small wheel side tilt position. The vertical line H is located within the pivoting range W. It is therefore possible for the movable member 7 to make a sufficient stroke transversely of the bicycle to provide three speeds, while reducing a length M of the pivotal link 5 from the first pivotal axis 5a to the second pivotal axis 5b, or reducing the pivoting angle of the pivotal link 5, compared with the case where the vertical line H is located at an end of the pivoting angle W. Further, as shown in FIG. 9, a shifting operation may be carried out with a relatively small variation in a reaction to the operation caused by the return spring 8.

Figure 10:
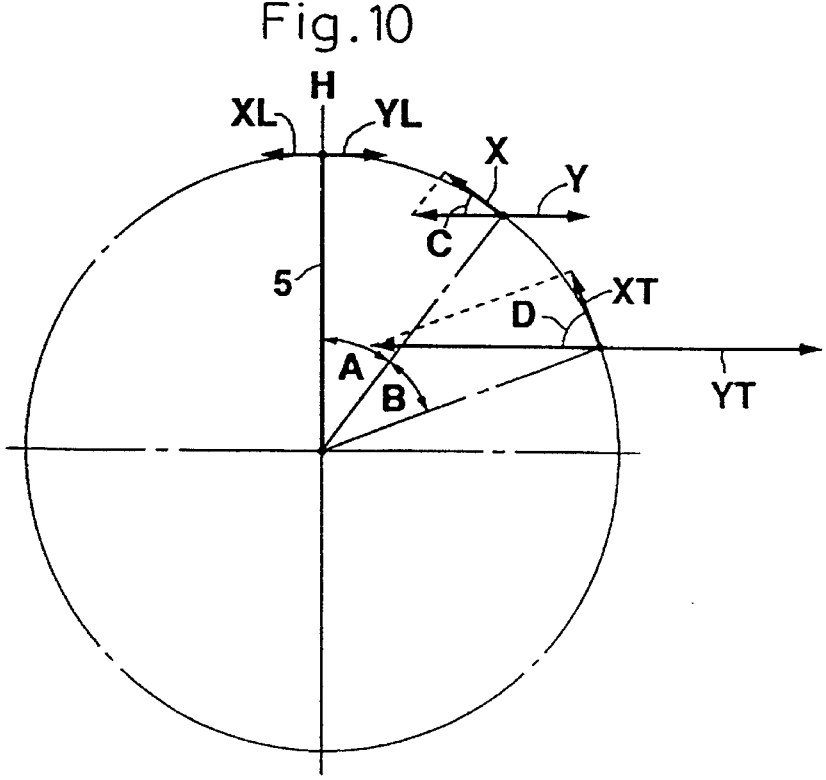
FIG. 10 is a view showing a torque applied to a pivotal link of a front derailleur according to the prior art.

Specifically, where the vertical line H is located at an end of the pivoting range, as shown in FIG. 10, the return spring 8 applies a turning force XL to the pivotal link 5 when the pivotal link 5 is in the low speed position. An operating force YL is needed to cause the pivotal link 5 to pivot from the low speed position against the return spring 8. When the pivotal link 5 pivots from the low speed position through an angle A to an intermediate position, the pivotal link 5 receives a turning force X from the return spring 8. An operating force Y is needed to cause the pivotal link 5 to pivot from the intermediate position against the return spring 8. When the pivotal link 5 pivots from the intermediate position through an angle B to a high speed position, the pivotal link 5 receives a turning force XT from the return spring 8. An operating force YT is needed to cause the pivotal link 5 to pivot to the high speed position against the return spring 8. Even if the turning forces XL, X and XT are the same, the operating force Y is greater than the operating force YL, and the operating force YT greater than the operating force Y since an angle C in the intermediate position and an angle D in the high speed position are different. In practice, however, the return spring 8 undergoes a varying elastic deformation with the pivotal movement of the pivotal link 5, whereby the turning force X becomes greater than the turning force XL, and the turning force XT greater than the turning force X. Consequently, the operating force Y is greater than the operating force YL, and the operating force YT greater than the operating force Y. In particular, a great difference occurs between the operating force YT in the high speed position and the operating force YL in the low speed position.

Figure 9:
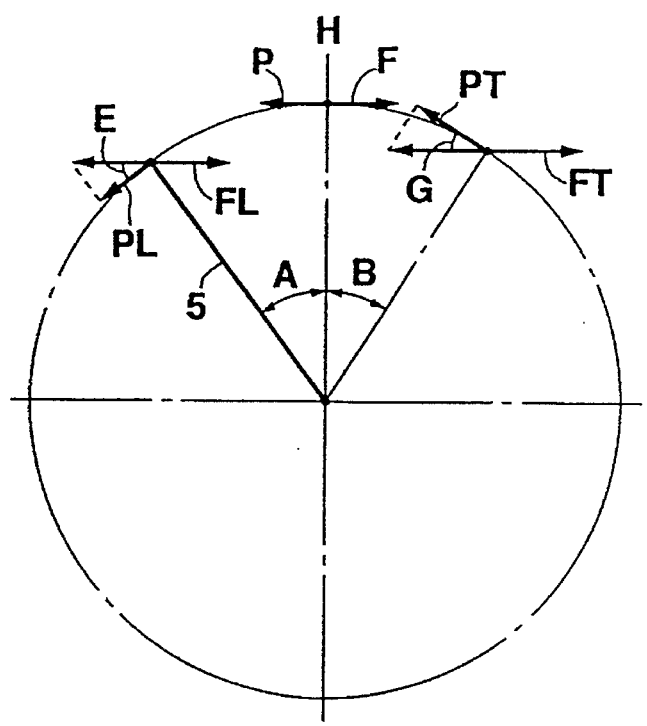
FIG. 9 is a view showing a torque applied to a pivotal link of the front derailleur according to the present invention.

On the other hand, where the vertical line H is located within the pivoting range, as shown in FIG. 9, the return spring 8 applies a turning force PL to the pivotal link 5 when the pivotal link 5 is in the low speed position. An operating force FL is needed to cause the pivotal link 5 to pivot from the low speed position against the return spring 8. When the pivotal link 5 pivots through the large wheel side tilt angle A to the vertically extending intermediate position, the pivotal link 5 receives a turning force P from the return spring 8. An operating force F is needed to cause the pivotal link 5 to pivot from the intermediate position against the return spring 8. When the pivotal link 5 pivots from the intermediate position through the small wheel side tilt angle B to the high speed position, the pivotal link 5 receives a turning force PT from the return spring 8. An operating force FT is needed to cause the pivotal link 5 to pivot to the high speed position against the return spring 8. Even if the turning forces PT in FIG. 9 equals the turning force XT in FIG. 10, the turning force PT in the high speed position in FIG. 9 is smaller than the turning force XT in the high speed position in FIG. 10 because of the positional relationship between the vertically extending intermediate position and the high speed position. Further, in FIG. 9, because the return spring 8 undergoes a varying elastic deformation with the pivotal movement of the pivotal link 5, the turning force P in the intermediate position becomes greater than the turning force PL in the low speed position, and the turning force PT in the high speed position greater than the turning force P in the intermediate position. This and the fact that FL=PL/cosE and FT=PT/cosG may be taken into account in setting the large wheel side tilt angle B and small wheel side tilt angle A, thereby to eliminate or diminish the differences among the operating forces FL, F and FT. It will be clear from FIG. 9 that angle E equals angle A, and angle G equals angle B.

In this embodiment, the length M from the first pivotal axis 5a or third pivotal axis 6a to the second pivotal axis 5b or fourth pivotal axis 6b of the four-point link mechanism is set to about 14 mm. The large wheel side tilt angle B is set to about 32 degrees 24 minutes, and the small wheel side tilt angle A to about 37 degrees 23 minutes, with the front derailleur assembled to the bicycle such that the movable member 7 is in the low speed position when the center position CP is at the distance L1 of 39 mm from the axis Z of the seat tube 1b, and in the high speed position when the center position CP is at the distance L2 of 53 mm from the axis Z of the seat tube 1b. The above length M may be set to other values than 14 mm, such as 16 mm or various values less than 16 mm. By setting this length to 16 mm or less, the operating forces based on a link ratio may be diminished effectively. The large wheel side tilt angle B and small wheel side tilt angle A are set to the predetermined angles, based on a relationship between the length M and the stroke of the movable member 7 necessary to effect the shifting operations.

As seen from FIGS. 6 and 7A, the mounting bracket 3a includes a chain retainer bulge 40 and a projecting portion 43 formed integral therewith. This construction prevents the chain 9 from falling between the small chainwheel G1 and the mounting bracket 3a of the fixed member 3.

Figure 7C:
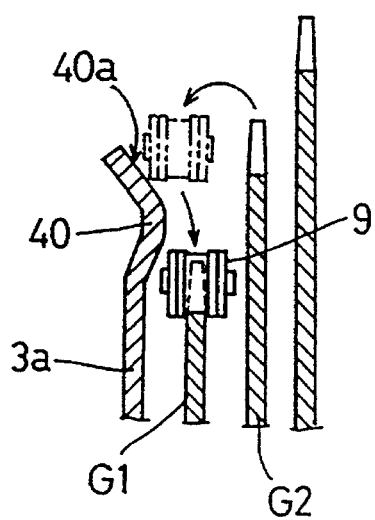
FIG. 7C and 7D are plan views showing a chain retainer bulge.
Figure 7D:
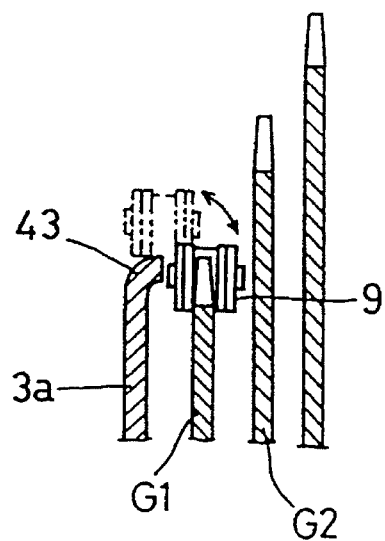

Specifically, as seen from FIGS. 6 and 7A, part of an upper end portion of the mounting bracket 3a, forward with respect to a rotating direction of the chainwheels, is bulged toward the small chainwheel G1. As seen from FIG. 7c, this bulge 40 is located slightly below teeth of the intermediate chainwheel G2, with an upper surface 40a thereof inclined toward the small chainwheel G1. Consequently, when the shifter plate 7b is moved to change the chain 9 from the intermediate chainwheel G2 to the small chainwheel G1, the chain 9 disengaged from the intermediate chainwheel G2 will contact the bulge 40 to be guided by its upper surface 40a to the small chainwheel G1. In this way, the chain 9 is changed to the small chainwheel G1 reliably instead of moving over the small chainwheel G1 and falling between the chainwheel G1 and mounting bracket 3a. As shown in FIG. 7D, the mounting bracket 3a is bent toward the small chainwheel G1 in a position forwardly of the bulge 40 with respect to the rotating direction of the chainwheels, to define the projecting portion 43 integral with the mounting bracket 3a. The projecting portion 43 is disposed adjacent the bulge 40, and extends toward an axis X of the bottom bracket 1a, with a radius of curvature thereof diminishing forwardly with respect to the rotating direction of the chainwheels. When the small chainwheel G1 is rotated backward with the chain 9 engaged, the chain 9 may be disengaged gradually from the chainwheel G1 in a low position thereof owing to a lack of tension. In the end, the chain 9 could fall between the small chainwheel G1 and mounting bracket 3a. However, as shown in FIG. 7D, the projection portion 43 will contact and uphold the chain 9. When the chainwheel G1 is rotated forward subsequently, the chain 9 is restored on the small chainwheel G1 by action of the upper surface 40a of the bulge 40.

Figure 11:
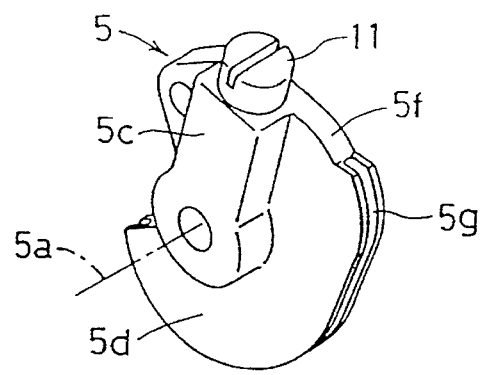
FIG. 11 is a view showing a pivotal link in another embodiment of the present invention.

FIG. 11 shows a pivotal link 5 in a different embodiment. As distinct from the pivotal link 5 in the preceding embodiment, this pivotal link 5 includes an extension 5d extending from a region of the wire connecting screw 11 for fixing the inner wire 12 of the control cable, in excess of 180 degrees about a perforation defining the pivotal axis 5a of the link 5. A groove 5g is formed peripherally of this extension to receive the wire 12a.

Figure 12:
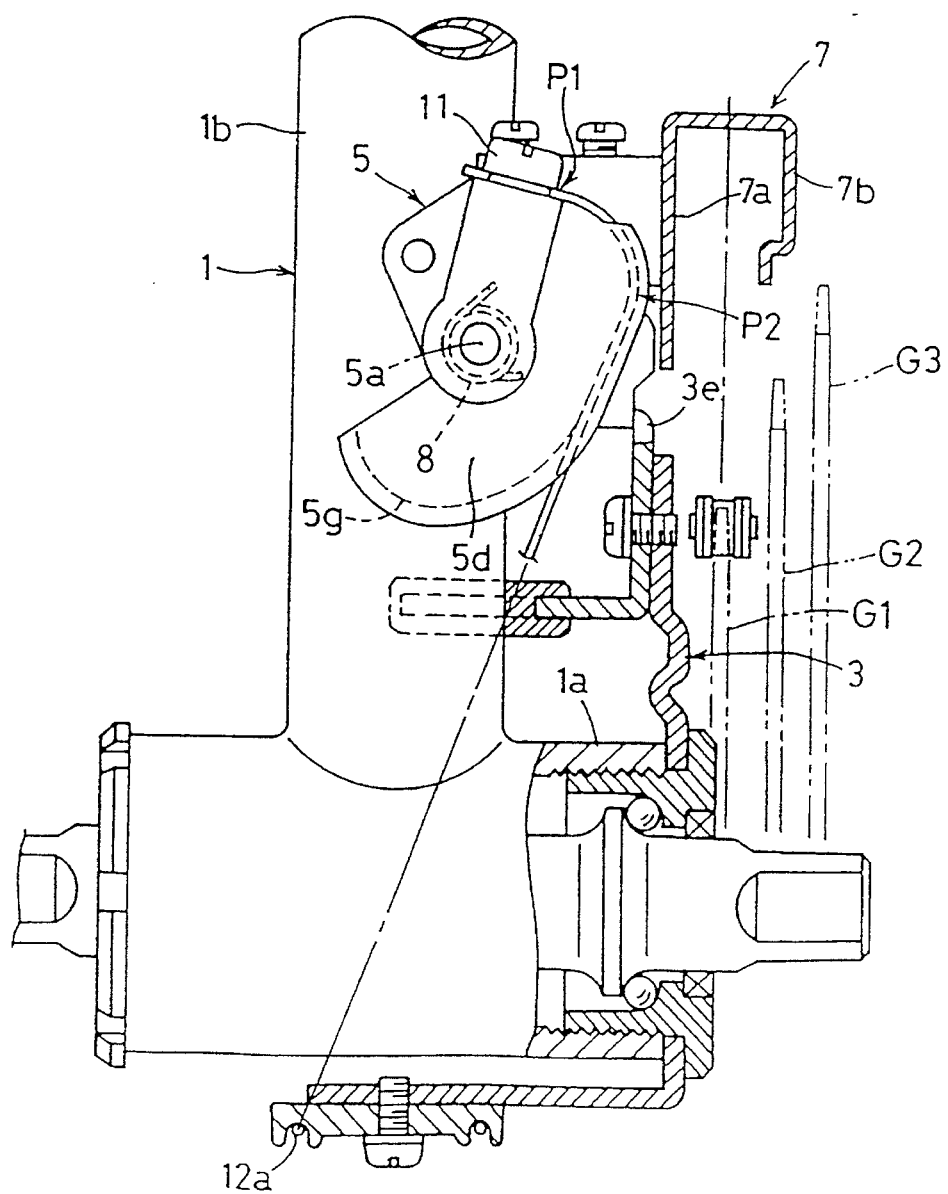
FIG. 12 is a view, partly in section, showing the pivotal link of FIG. 11 applied to a front derailleur.
Figure 13:
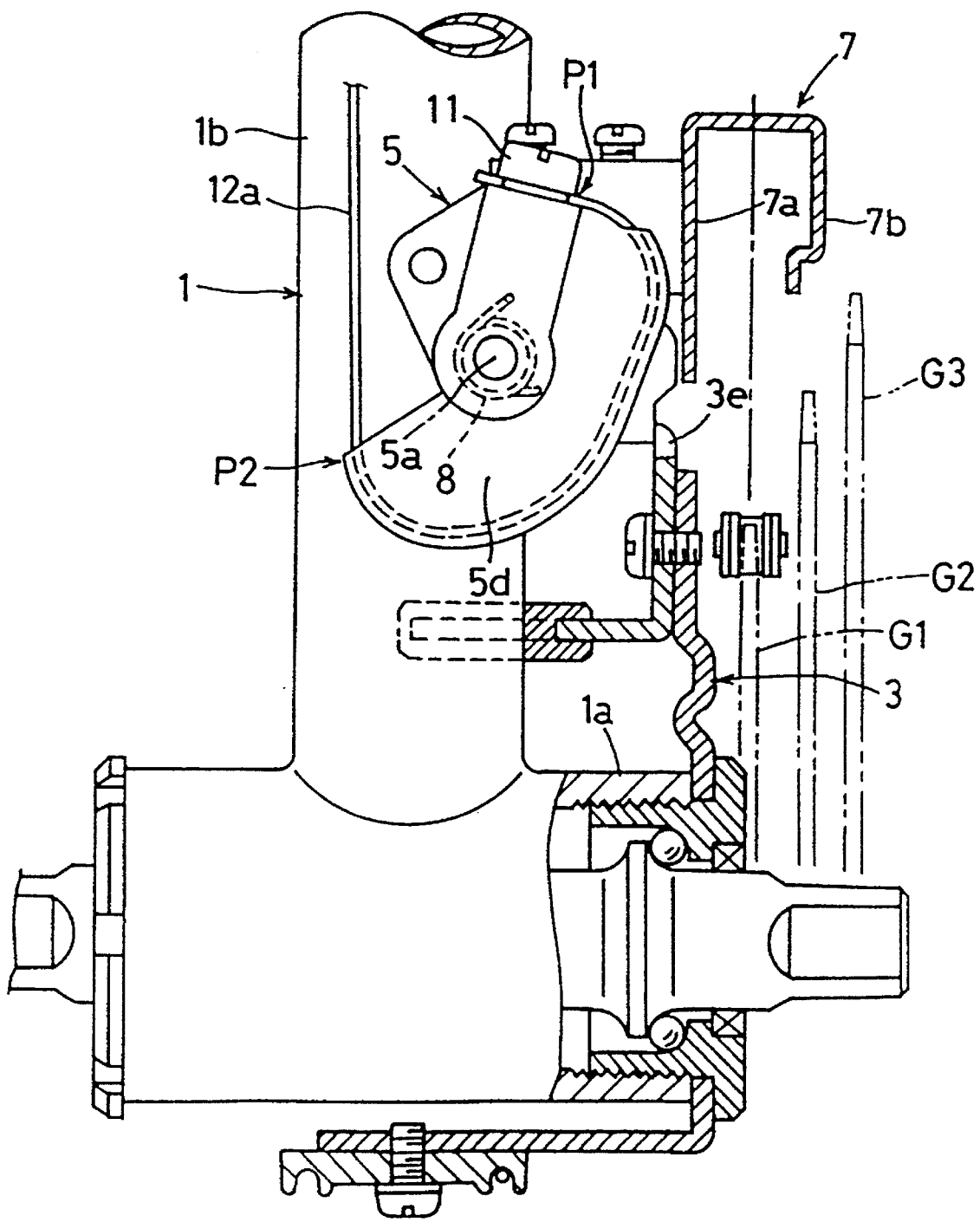
FIG. 13 is a view, partly in section, showing the pivotal link of FIG. 11 applied to a front derailleur in a different mode to what is shown in FIG. 12.

Thus, when the wire 12a extends downward to be used as what is known as the pull-down type as shown in FIG. 12, and the shifter plates 7a and 7b are moved toward the small chainwheel G1 under the action of the return spring 8, a point of contact P2 between the pivotal link 5 and wire 12a is located between the pivotal axis 5a of the pivotal link 5 and the shifter plate 7a as in the preceding embodiment. In this ease also, the wire connecting screw 11 is disposed away from the shifter plates 7a and 7b to facilitate an operation to fix the wire 12a.

Besides, the wire 12a may readily be adapted to extend upward to be used as what is known as the pull-up type. In this ease, the point of contact P2 between the pivotal link 5 and wire 12a is opposed to the shifter plate 7a across the pivotal axis 5a. However, this arrangement also facilitates the wire fixing operation.

Thus, when the pivotal link 5 shown in FIG. 11 is employed, one front derailleur may be used selectively as the pull-down type and pull-up type without modification. This achieves a cost reduction based on shared use of the same construction, and provides the user with a great convenience.

Figure 14:
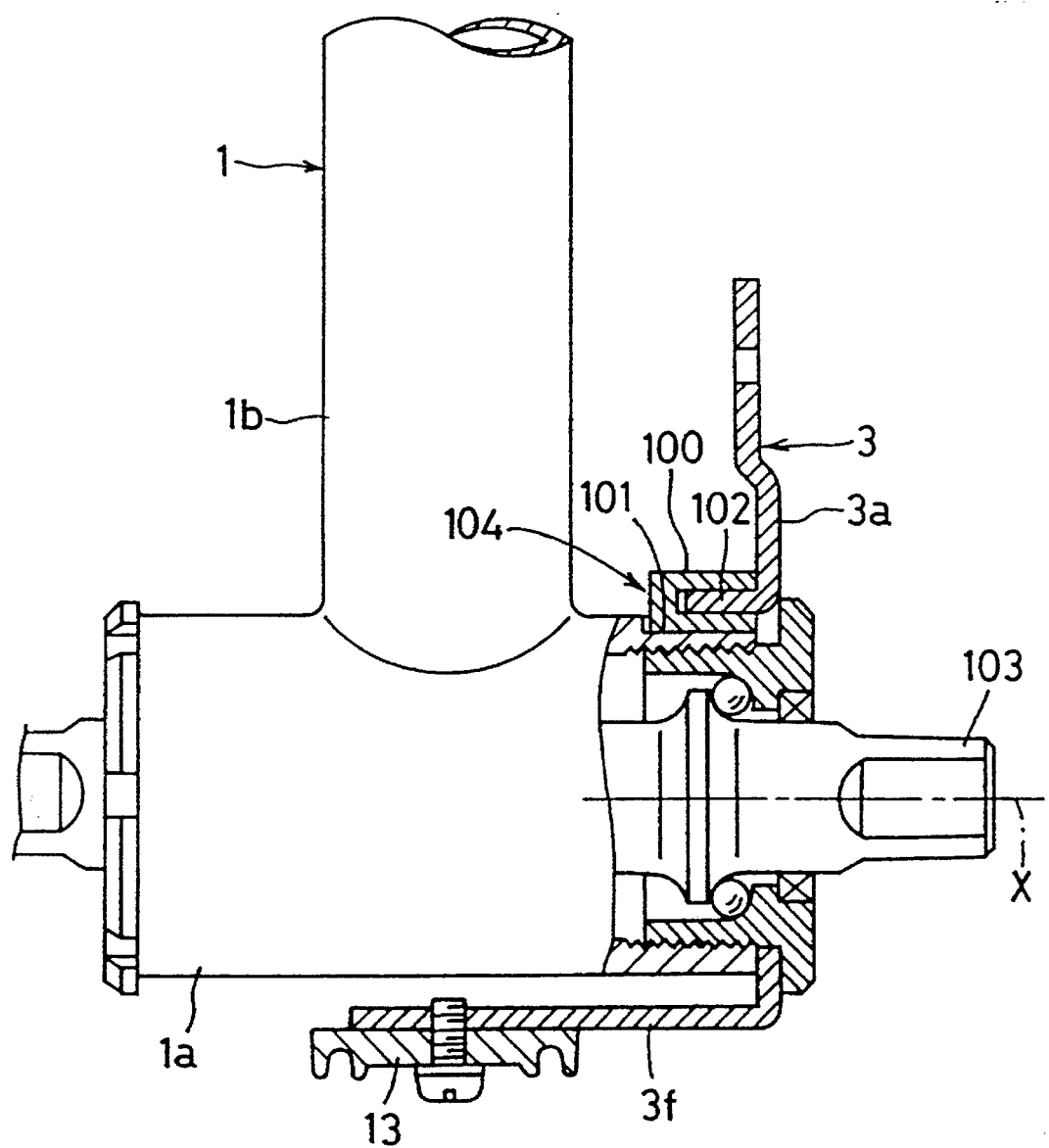
FIG. 14 is a view, partly in section, showing a rotation stopper in a further embodiment of the present invention.
Figure 15:
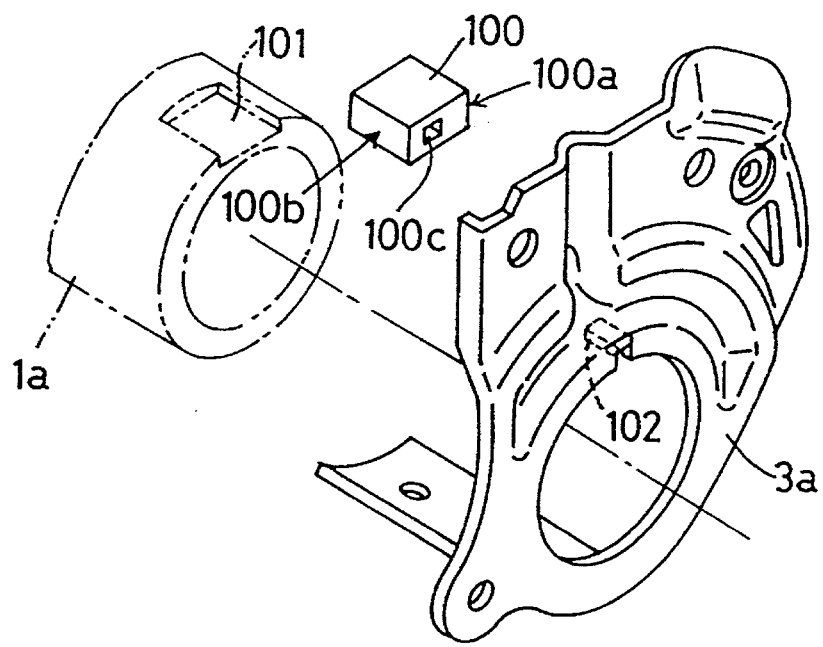
FIG. 15 is a perspective view of the rotation stopper shown in FIG. 14.
Figure 16:
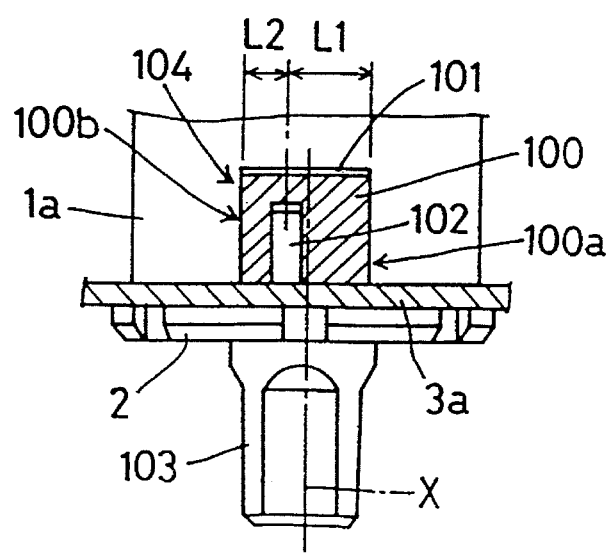
FIG. 16 is a top plan view, partly in section, of the rotation stopper shown in FIG. 14.

FIGS. 14 through 16 show a rotation stopper in a further embodiment. In this embodiment, the bottom bracket 1a has a cutout 101 formed in part of an end surface thereof. On the other hand, the mounting bracket 3a of the fixed member 3 has a portion thereof bent toward the bottom bracket 1a to define a projection 102. A plastic contact member 100 is attached in a variable mounting position to the projection 102 through a mounting bore 100c. The contact member 100 is mounted in the cutout 101. The contact member 100 has front and rear contact surfaces 100a and 100b for contacting contact surfaces of the cutout 101. As shown in FIG. 16, a distance L1 from the center of the mounting bore 100c to one contact surface 100a is longer than a distance L2 from the center of the mounting bore 100c to the other contact surface 100b, which is reversed from the preceding embodiment.

This embodiment also accommodates variations in the angle 0 between the seat tube 1b and chain stay 1c. That is, the contact member 100 is attachable to the projection 102 through the mounting bore 100c, in a first position having the contact surface 100a directed forward or in a second position vertically reversed therefrom and having the contact surface 100b directing forward. Thus, as seen from the mounting bracket 3a, the contact surface substantially contacting the bottom bracket 1a may be varied longitudinally of the bicycle. In this embodiment, the contact member 100 having the two contact surfaces 100a and 100b and mounting bore 100c, and the projection 102, constitute an adjusting device 104 for varying a position of a substantial contact surface relative to the mounting bracket 3a longitudinally of the bicycle. This adjusting device 104 is provided between the mounting bracket 3a and contact surfaces 100a and 100b.

Further, in this embodiment, only the mounting bracket 3a of the fixed member 3 contacts the bicycle frame, the support member 3b being in an entirely free state.

In the embodiments described hereinbefore, the contact member 10 or 100 is placed in contact with the seat tube 1b of the bicycle frame or the contact surfaces 10a, 100a and 100b are placed in contact with the contact surfaces of the bottom bracket 1a, to position the mounting bracket 3a. These components may be adapted to contact a down tube 1d or chain stay 1c, instead.

Various constructions may be employed for the adjusting device. Instead of varying positions of the contact surfaces by changing facing directions of the contact member 10 or 100, the positions of the contact surfaces may be varied by using bolts or the like, or inserting a spacer between the contact member and proximal end 3e.

It is not absolutely necessary to divide the fixed member into the support member 3b and mounting bracket 3a as in the foregoing embodiments. An entire mounting member may be formed of a single plate.

Figure 17:
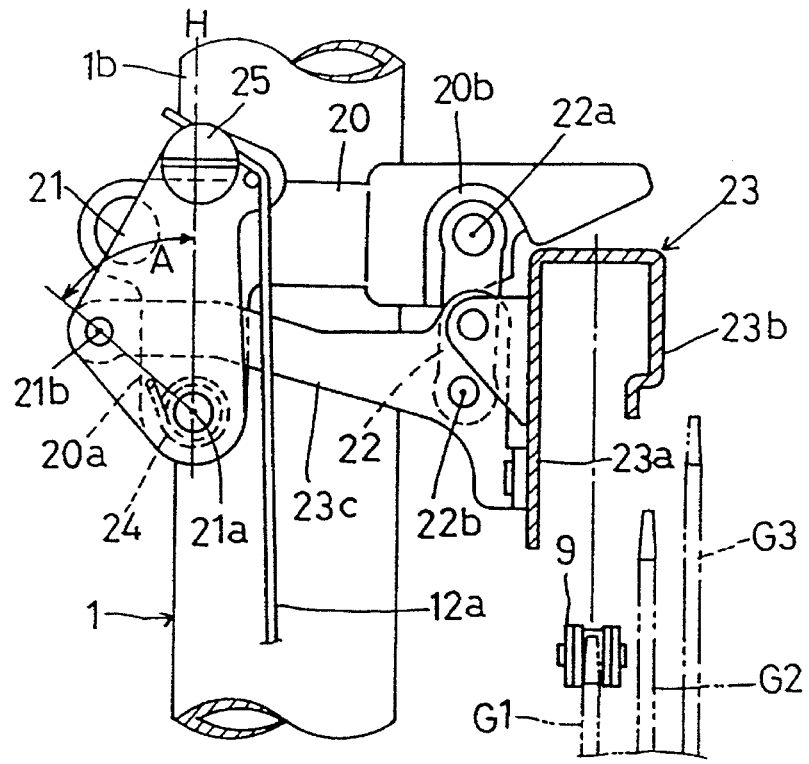
FIG. 17 is a view showing a four-point link mechanism of a front derailleur in a further embodiment of the invention.
Figure 18:
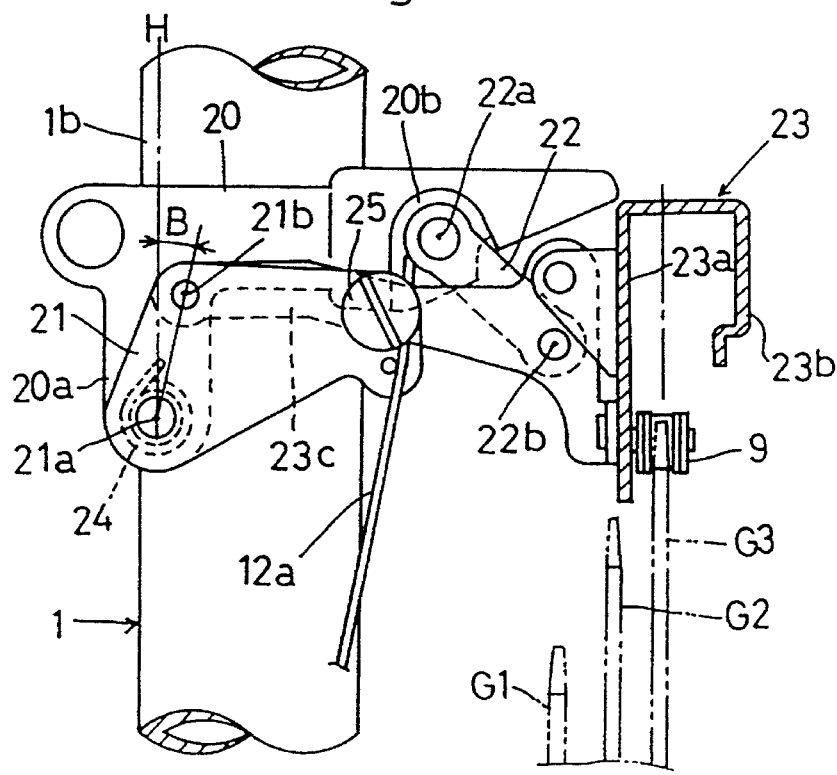
FIG. 18 is a view showing the front derailleur of FIG. 17 in a different position.

A derailleur shown in FIG. 17 will be described next.

This derailleur is a triple front derailleur for a bicycle. A band type fixed member 20 is fastened to a seat tube 1b of a bicycle frame 1. A pair of pivotal links 21 and 22 connect a chain guide 23 having a pair of right and left shifter plates 23a and 23b to the fixed member 20. A return spring 24 is mounted in a proximal end of the inner one 21 of the pair of pivotal links 21 and 22. The return spring 24 biases the pivotal link 21, with the fixed member 20 acting as a reaction member, to bias the chain guide 23 toward the fixed member 20.

In interconnecting the fixed member 20 and chain guide 23 through the pivotal links 21 and 22, the inner pivotal link 21 is pivotally connected at a proximal end thereof to a first link support portion 20a of the fixed member 20 to be pivotable about a pivotal axis 21a extending longitudinally of the bicycle. A free end of the pivotal link 21 is connected to a forward end of an arm 23c extending inwardly from a main body of the chain guide 23 to be pivotable relative thereto about a pivotal axis 21b extending substantially parallel to the pivotal axis 21a. The pivotal link 22 disposed between the pivotal link 21 and shifter plate 23a is connected at a distal end thereof to a second link support portion 20b of the fixed member 20 to be pivotable about a pivotal axis 22a extending longitudinally of the bicycle. A free end of the pivotal link 22 is connected to a proximal position of the arm 23c of the chain guide 23 to be pivotable relative thereto about a pivotal axis 22b extending substantially parallel to the pivotal axis 22a. Thus, with a pivotal movement of the pivotal links 21 and 22 relative to the fixed member 20, the chain guide 23 moves transversely relative to the bicycle frame 1.

The free end of the pivotal link 21 has a wire connecting screw 25 for connecting an inner wire 12a of a control cable extending from a shaft lever device (not shown). When the inner wire 12a is pulled, its operating force causes the pivotal links 21 and 22 to pivot outwardly of the bicycle relative to the fixed member 20 to move the chain guide 23 outwardly. Then, the inner one 23a of the pair of shifter plates 23a and 23b presses the chain 9 and changes the chain 9 from a small chainwheel G1 to an intermediate chainwheel G2 or from the intermediate chainwheel G2 to a large chainwheel G3. When the inner wire 12a is relaxed, the pivotal links 21 and 22, under the elastic restoring force of the return spring 24, pivot inwardly of the bicycle relative to the fixed member 20 to move the chain guide 23 inwardly. Then, the outer one 23b of the pair of shifter plates 23a and 23b presses the chain 9 and changes the chain 9 from the large chainwheel G3 to the intermediate chainwheel G2 or from the intermediate chainwheel G2 to the small chainwheel G1.

Figure 19:
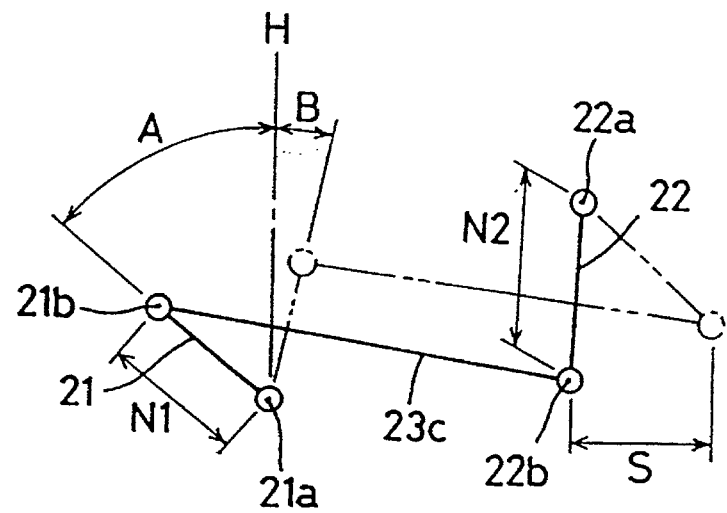
FIG. 19 is a schematic view of the link mechanism shown in FIG. 17.

The pivotal axis 21a through which the fixed member 20 supports the pivotal link 21 is disposed below the pivotal axis 21b on the chain guide 23. The pivotal axis 22a through which the fixed member 20 supports the pivotal link 22 is disposed above the pivotal axis 22b on the chain guide 23. Consequently, the pivotal link 21 is operable as shown in FIG. 19 to effect shifting operations.

It is assumed that the pivotal link 21 extends vertically when a phantom line extending through the pivotal axis 21a on the fixed member 20 and the pivotal axis 21b on the chain guide 23 coincides with a vertical line. This phantom vertical line is called herein a vertical line H. The chain guide 23 is in a high speed position to engage the chain 9 on the large chainwheel G3 when the pivotal link 21 has pivoted to one side of the vertical line H, i.e. to a large wheel side tilt position at an angle B outwardly of the bicycle from the vertical line H. The chain guide 23 is in a low speed position to engage the chain 9 with the small chainwheel G1 when the pivotal link 21 has pivoted to the other side of the vertical line H, i.e. to a small wheel side tilt position at an angle A inwardly of the bicycle from the vertical line H, the angle A being larger than the angle B.

The length N1 of the pivotal link 21 from the pivotal axis 21a to the pivotal axis 21b, and the length N2 of the pivotal link 22 from the pivotal axis 22a to the pivotal axis 22b, the small wheel side tilt angle A, and the large wheel side tilt angle B may be selected as appropriate, but are set to the following values to give the chain guide 23 a moving stroke S of 14 mm:

length N1=about 16 mm; length N2=about 20 mm; small wheel side tilt angle A=about 51 degrees 29 minutes; and large wheel side tilt angle B=about 12 degrees 16 minutes.

Figure 20:
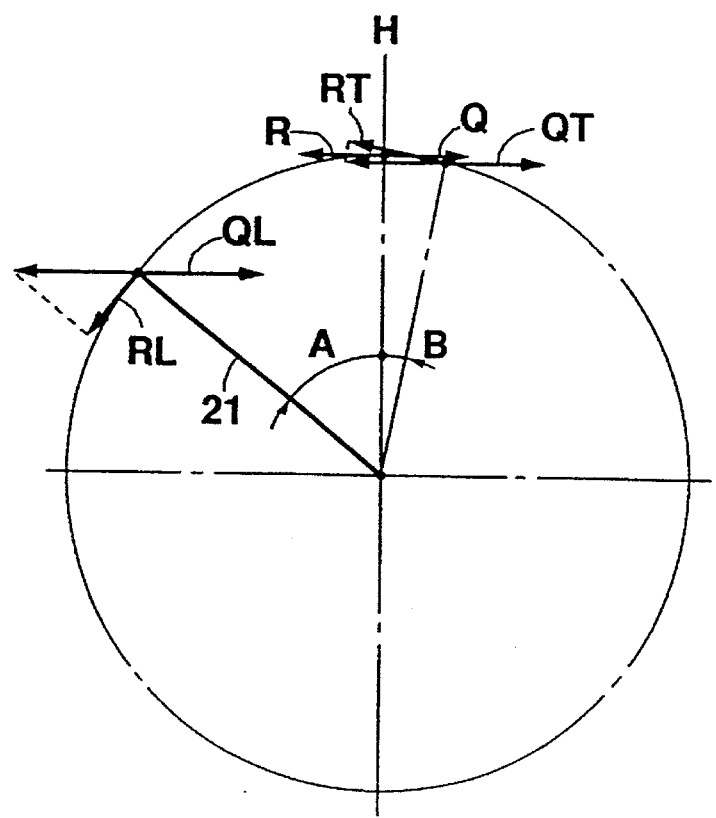
FIG. 20 is a schematic view showing a torque applied to pivotal link of the front derailleur shown in FIG. 17.

Thus, as shown in FIG. 20, the return spring 24 applies a turning force RL to the pivotal link 21 when the pivotal link 21 is in a low speed position. An operating force QL is needed to cause the pivotal link 21 to pivot from the low speed position against the return spring 24. When the pivotal link 21 pivots through the large wheel side tilt angle A to a vertically extending intermediate position, the pivotal link 21 receives a turning force R from the return spring 24. An operating force Q is needed to cause the pivotal link 21 to pivot from the intermediate position against the return spring 24. When the pivotal link 21 pivots from the intermediate position through the small wheel side tilt angle B to a high speed position, the pivotal link 21 receives a turning force RT from the return spring 24. An operating force QT is needed to cause the pivotal link 21 to pivot to the high speed position against the return spring 24. Then, with the lengths of the pivotal links 21 and 22 and the small wheel side tilt angle A and large wheel side tilt angle B set to the values noted above, the operating forces QL, Q and QT am substantially the same.

Figure 21:
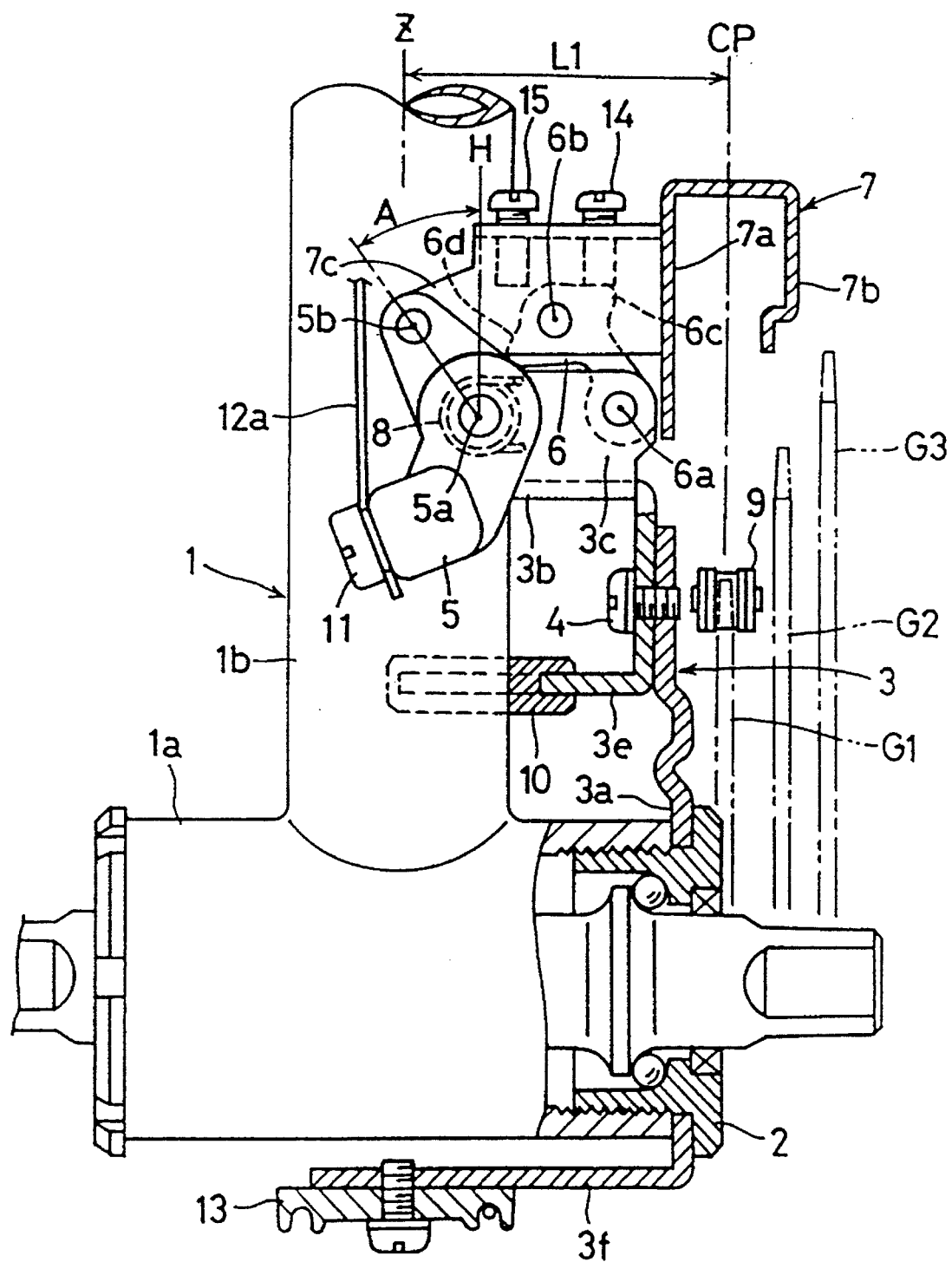
FIG. 21 is a view, partly in section, of a front derailleur having a cable attaching portion in a further embodiment.
Figure 22:
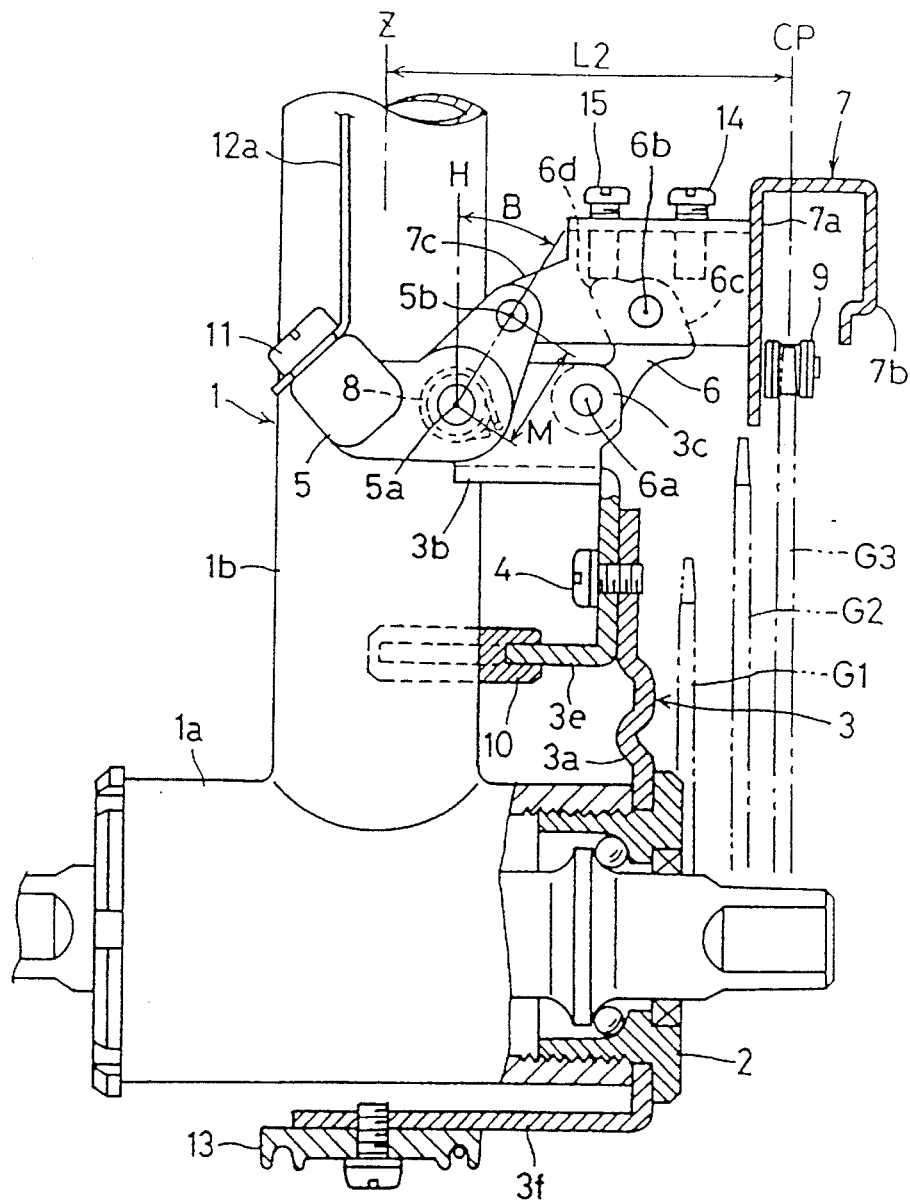
FIG. 22 is a view showing the front derailleur of FIG. 21 in a different position.

FIGS. 21 and 22 show a triple front derailleur in a further embodiment, which is different from the triple front derailleur shown in FIGS. 1 and 2, only in the construction for connecting the inner wire 12a of the control cable. The other aspects of this embodiment are the same as the first embodiment.

Figure 23:
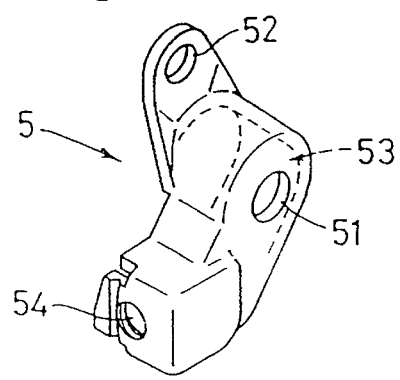
FIG. 23 is a perspective view of the cable attaching portion shown in FIG. 21.

In FIGS. 1 and 2, the fixed member 3 and movable member 7 are interconnected through the pair of pivotal links 5 and 6. One of these pivotal links 5 includes the return spring 8, and has the inner wire 12a connected thereto. This pivotal link 5 is replaced in this embodiment by a pull-up type pivotal link as shown in FIG. 23. The pull-up type pivotal link 5 in this embodiment includes a first pinhole 51, a second pinhole 52, a spring chamber 53 and a threaded bore 54. The pivotal link 5 is connected through the first pinhole 51 to the link support 3c of the support member 3 to be pivotable about the first pivotal axis 5a. The pivotal link 5 is connected through the second pinhole 52 to the connecting portion 7c of the movable member 7 to be pivotable relative thereto about the second pivotal axis 5b. The return spring 8 is mounted in the spring chamber 53. The wire connecting screw 11 is attached to the threaded bore 54. An arm 5c defining the threaded bore 54, and the first pinhole 51 and second pinhole 52, are arranged such that the arm portion 5c is opposed to guide plates 7a and 7b across the first pivotal axis 5a when the pivotal link 5 is connected to the movable member 7 and to the support member 3b of the fixed member 3 and the movable member 7 is in a low speed position. That is, the inner wire 12a of the control cable is placed to extend along the bicycle frame 1 to reach the front derailleur from above, and fixed to the pivotal link 5 by the wire connecting screw 11. When the inner wire 12a is pulled to raise the arm portion 5c of the pivotal link 5 about the first pivotal axis 5a, the arm portion of the pivotal link 5 having the second pivotal axis 5b, and the pivotal link 6, pivot outwardly of the bicycle relative to the fixed member 3 to move the movable member 7 outwardly. Then, the inner one 7a of the pair of shifter plates 7a and 7b presses the chain 9 and changes the chain 9 from the small chainwheel G1 to the intermediate chainwheel G2 or from the intermediate chainwheel G2 to the large chainwheel G3. When the inner wire 12a is relaxed, the arm portion of the pivotal link 5 having the second pivotal axis 5b, and the pivotal link 6, under the elastic restoring force of the return spring 8, pivot inwardly of the bicycle relative to the fixed member 3 to move the movable member 7 inwardly. Then, the outer one 7b of the pair of shifter plates 7a and 7b presses the chain 9 and changes the chain 9 from the large chainwheel G3 to the intermediate chainwheel G2 or from the intermediate chainwheel G2 to the small chainwheel G1.

The first pivotal axis 5a and second pivotal axis 5b of this pull-up type pivotal link 5 have the same spacing and positional relationship therebetween as those of the axes 5a and 5b of the pivotal link 5 shown in FIGS. 1 and 2. Consequently, when the center position CP between the shifter plates 7a and 7b is at the distance L1 of 39 mm from the axis Z of the seat tube 1b, the movable member 7 is in a low speed position to engage the chain 9 with the small chainwheel G1. When the center position CP is at the distance L2 of 53 mm from the axis Z of the seat tube 1b, the movable member 7 is in a high speed position to engage the chain 9 with the large chainwheel G3. With the front derailleur assembled to the bicycle frame 1, the pull-up type pivotal link 5 is operable as is the pivotal link 5 shown in FIG. 1 to effect shifting operations.

It is assumed that the pivotal link 5 extends vertically when a phantom line extending through the first pivotal axis 5a on the fixed member 3 and the second pivotal axis 51b on the movable member 7 coincides with a vertical line. This phantom vertical line is called herein a vertical line H. The movable member 7 is in the high speed position when the pivotal link 5 has pivoted to one side of the vertical line H, i.e. to a large wheel side tilt position at an angle B outwardly of the bicycle from the vertical line H. The movable member 7 is in the low speed position when the pivotal link 5 has pivoted to the other side of the vertical line H, i.e. to a small wheel side tilt position at an angle A inwardly of the bicycle from the vertical line H, the angle A being larger than the angle B. The length M of the pivotal link 5 from the first pivotal axis 5*a* to the second pivotal axis 5*b* is set to about 14 mm. The large wheel side tilt angle B is set to about 32 degrees 24 minutes, and the small wheel side tilt angle A to about 37 degrees 23 minutes, with the front derailleur assembled to the bicycle such that the movable member 7 is in the low speed position when the center position CP is at the distance L1 of 39 mm from the axis Z of the seat tube 1*b*, and in the high speed position when the center position CP is at the distance L2 of 53 mm from the axis Z of the seat tube 1*b*. With this pull-up type pivotal link 5, the above length M may be set to other values than 14 mm, such as 16 mm or various values less than 16 mm. By setting this length to 16 mm or less, the operating forces based on a link ratio may be diminished effectively. The large wheel side tilt angle B and small wheel side tilt angle A are set to the predetermined angles, based on a relationship between the length M and the stroke of the movable member 7 necessary to effect the shifting operations.

Figure 24:
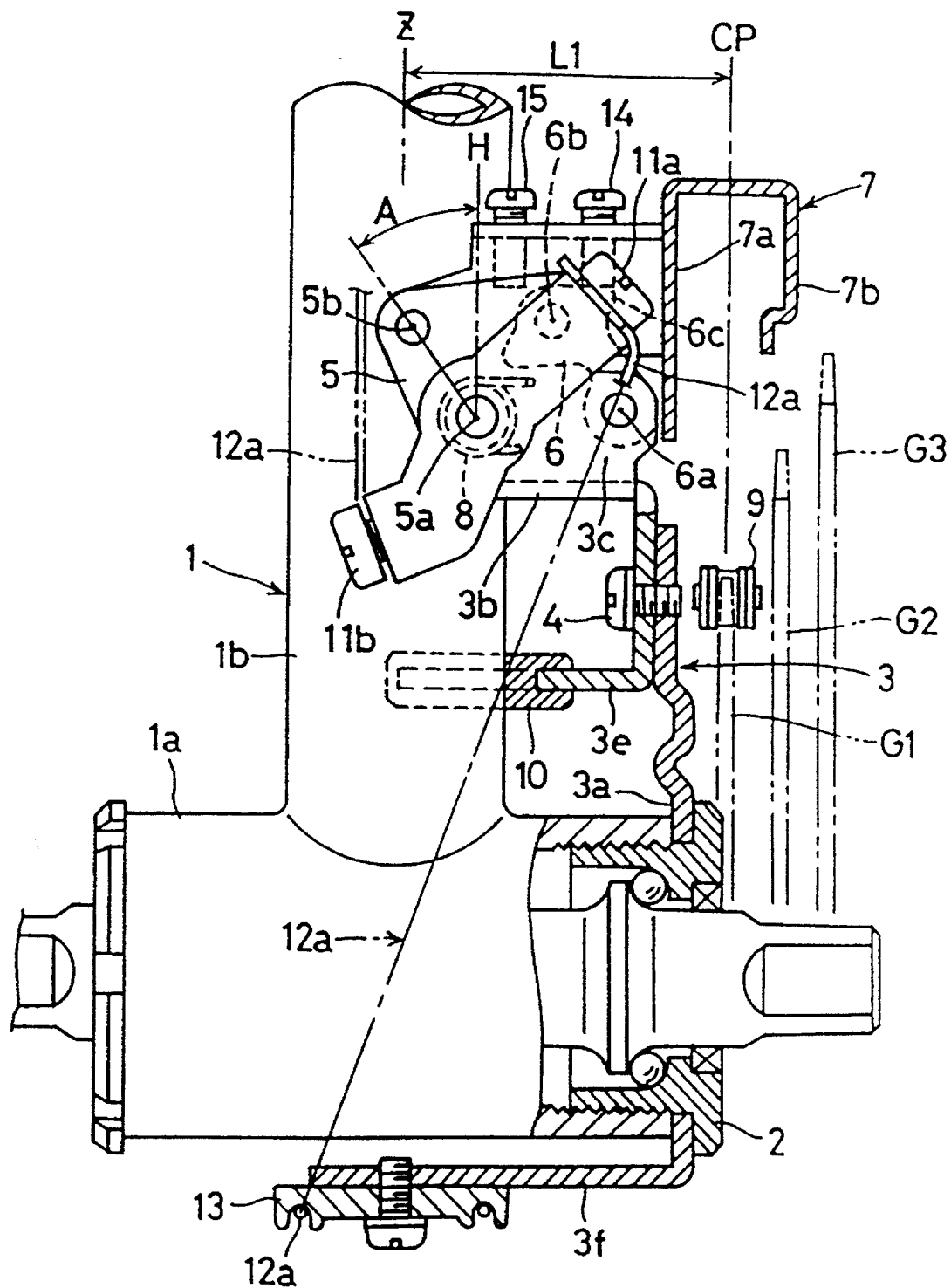
FIG. 24 is a view, partly in section, of a front derailleur having a cable attaching portion in a still further embodiment.

FIG. 24 shows a front derailleur for a bicycle in a still further embodiment, which is different from the triple front derailleurs shown in FIGS. 1 and 21, only in the construction for connecting the inner wire 12*a* of the control cable. The other aspects of this embodiment are the same as in those preceding embodiments.

The fixed member 3 and movable member 7 are interconnected through a pair of pivotal links 5 and 6. One of these pivotal links 5 includes a return spring 8, and has the inner wire 12*a* connected thereto. This pivotal link 5 has a pair of wire connecting screws 11*a* and 11*b*. The inner wire 12*a* may extend from below the bottom bracket 1*a* to the derailleur, in which case the wire 12*a* is connected to the pivotal link 5 by the wire connecting screw 11*a* to control the derailleur. Alteratively, the inner wire 12*a* may extend along the bicycle frame 1 to reach the derailleur from above, in which case the wire 12*a* is connected to the pivotal link 5 by the wire connecting screw 11*b* to control the derailleur. Thus, this embodiment may be used selectively in the pull-up mode to pull the inner wire 12*a* upward to effect shifting operations, and in the pull-down mode to pull the inner wire 12*a* downward to effect shifting operations.

In this pull-up, pull-down type pivotal link 5 also, the first pivotal axis 5*a* and second pivotal axis 5*b* have the same spacing and positional relationship therebetween as those of the axes 5*a* and 5*b* of the pivotal link 5 shown in FIGS. 1 and 2. Consequently, when the center position CP between the shifter plates 7*a* and 7*b* is at the distance L1 of 39 mm from the axis Z of the seat tube 1*b*, the movable member 7 is in a low speed position to engage the chain 9 with the small chainwheel G1. When the center position CP is at the distance L2 of 53 mm from the axis Z of the seat tube 1*b*, the movable member 7 is in a high speed position to engage the chain 9 with the large chainwheel G3. With the front derailleur assembled to the bicycle frame 1, the pull-up, pull-down type pivotal link 5 is operable as is the pivotal link 5 shown in FIG. 1 to effect shifting operations.

It is assumed that the pivotal link 5 extends vertically when a phantom line extending through the first pivotal axis 5*a* on the fixed member 3 and the second pivotal axis 51*b* on the movable member 7 coincides with a vertical line. This phantom vertical line is called herein a vertical line H. The movable member 7 is in the high speed position when the pivotal link 5 has pivoted to one side of the vertical line H, i.e. to a large wheel side tilt position at an angle B outwardly of the bicycle from the vertical line H. The movable member 7 is in the low speed position when the pivotal link 5 has pivoted to the other side of the vertical line H, i.e. to a small wheel side tilt position at an angle A inwardly of the bicycle from the vertical line H, the angle A being larger than the angle B. The length of the pivotal link 5 from the first pivotal axis 5*a* to the second pivotal axis 5*b* is set to about 14 mm. The large wheel side tilt angle B is set to about 32 degrees 24 minutes, and the small wheel side tilt angle A to about 37 degrees 23 minutes, with the front derailleur assembled to the bicycle such that the movable member 7 is in the low speed position when the center position CP is at the distance L1 of 39 mm from the axis Z of the seat tube 1*b*, and in the high speed position when the center position CP is at the distance L2 of 53 mm from the axis Z of the seat tube 1*b*. With this pull-up, pull-down type pivotal link 5, the length from the first pivotal axis 5*a* to the second pivotal axis 5*b* may be set to other values than 14 mm, such as 16 mm or various values less than 16 mm. By setting this length to 16 mm or less, the operating forces based on a link ratio may be diminished effectively. The large wheel side tilt angle B and small wheel side tilt angle A are set to the predetermined angles, based on a relationship between the length from the first pivotal axis 5*a* to the second pivotal axis 5*b* and the stroke of the movable member 7 necessary to effect the shifting operations.

As in the derailleurs of FIGS. 1, 21 and 24, the four-point link mechanism may have a fixed lower link. This provides the advantage of presenting a neat outward appearance since the fixed member 3 is concealed behind the movable member 7 and chainwheels G1–G3 when seen from a position laterally outwardly of the chainwheels G1–G3. However, the present invention is applicable to a derailleur having a fixed link forming the upper part of a four-point link mechanism. Further, the present invention is applicable to a derailleur having a band type fixed member fastened to the seat tube instead of being attached to the bottom bracket.

Where the small wheel side tilt angle A is larger than the large wheel side tilt angle B, a constant shifting force may be realized reliably. However, it is also in accordance with the present invention that the small wheel side tilt angle A is smaller than the large wheel side tilt angle B, and that the small wheel side tilt angle A equals the large wheel side tilt angle B.

What is claimed is:

1. A from derailleur apparatus attachable to a frame of a bicycle for shifting a chain between a small sprocket and a large sprocket comprising:

a fixed section for attaching said front derailleur to said frame;

a movable section positioned above said fixed section for moving between first and second positions with respect to said fixed section;

a chain guide attached to said movable section for contacting said chain to shift said chain;

wherein said first position corresponds to a position of said chain guide when said chain guide is facing said small sprocket;

wherein said second position corresponds to a position of said chain guide when said chain guide is facing said large sprocket;

a first pivotal link disposed between said fixed section and said movable section for movably supporting said movable section with respect to said fixed section, said first pivotal link being supported to said fixed section to pivot about a first pivotal axis, said pivotal link being supported to said movable section to pivot about a second pivotal axis, a phantom line extending through said first pivotal axis and said second pivotal axis being tilted inwardly of said bicycle with respect to a vertical line of said bicycle when said movable section is in said first position, said phantom line being tilted outwardly of said bicycle with respect to said vertical line when said movable section is in said second position; and a second pivotal link disposed outwardly of said bicycle with respect to said first pivotal link and pivotably attached to said fixed section and to said movable section for movably supporting said movable section with respect to said fixed section in cooperation with said first pivotal link.

2. A front derailleur as defined in claim 1, wherein a tilt angle of said phantom line with respect to said vertical line when said movable section is in said first position is greater than a tilt angle of said phantom line when said movable section is in said second position.

3. A front derailleur as defined in claim 1, wherein said first and second pivotal axes are parallel to each other, and said first and second pivotal axes are positioned for overlapping with said bicycle frame viewed along said first and second pivotal axes.

4. A front derailleur as defined in claim 1, wherein said movable section having an adjusting screw for adjusting a stroke end of said movable section with respect to said fixed section, one of said first and second movable links having a contact portion for contacting said adjusting screw.

5. A front derailleur apparatus attachable to a frame of a bicycle for shifting a chain between a small sprocket and a large sprocket comprising:

a fixed section for attaching said from derailleur to said frame;

a movable section positioned above said fixed section for moving between first and second positions with respect to said fixed section;

a chain guide attached to said movable section for contacting said chain to shift said chain;

wherein said first position corresponds to a position of said chain guide when said chain guide is facing said small sprocket;

wherein said second position corresponds to a position of said chain guide when said chain guide is facing said large sprocket;

a first pivotal link disposed between said fixed section and said movable section for movably supporting said movable section with respect to said fixed section, said first pivotal link being supported to said fixed section to pivot about a first pivotal axis, said pivotal link being supported to said movable section to pivot about a second pivotal axis, said second pivotal axis positioned on one side of a vertical line of said bicycle viewed along said first pivotal axis when said movable section is in said first position, and said pivotal axis positioned on the other side of said vertical line when said movable section is in said second position; and a second pivotal link disposed outwardly of said bicycle with respect to said first pivotal link and pivotably attached to said fixed section and to said movable section for movably supporting said movable section with respect to said fixed section in cooperation with said first pivotal link.

6. A front derailleur apparatus attachable to a frame of a bicycle for shifting a chain between a small sprocket and a large sprocket, said front derailleur apparatus comprising:

a fixed section for attaching said front derailleur to said frame;

a movable section positioned above said fixed section for moving between first and second positions with respect to said fixed section;

a chain guide attached to said movable section for contacting said chain to shift said chain;

wherein said first position corresponds to a position of said chain guide when said chain guide is facing said small sprocket;

wherein said second position corresponds to a position of said chain guide when said chain guide is facing said large sprocket;

a first pivotal link disposed between said fixed section and said movable section for movably supporting said movable section with respect to said fixed section, said first pivotal link being supported to said fixed section to pivot about a first pivotal axis, said pivotal link being supported to said movable section to pivot about a second pivotal axis, a phantom line extending through said first and second pivotal axes being tilted away from said small and large sprocket when said movable section is in said first position, and said phantom line being tilted toward said small and large sprocket when said movable section is in said second position; and a second pivotal link disposed outwardly of said bicycle with respect to said first pivotal link and pivotably attached to said fixed section and to said movable section for movably supporting said movable section with respect to said fixed section in cooperation with said first pivotal link.

7. A front derailleur apparatus attachable to a frame of a bicycle for shifting a chain between a small sprocket and a large sprocket comprising:

a fixed section for attaching said front derailleur to said frame;

a movable section positioned above said fixed section for moving between a first transverse position and a second transverse position with respect to said fixed section;

a chain guide attached to said movable section for contacting said chain to shift said chain;

a first pivotal link extending upwardly and disposed between said fixed section and said movable section for movably supporting said movable section with respect to said fixed section, said first pivotal link being supported to said fixed section to pivot about a first pivotal axis, said first pivotal link being supported to said movable section to pivot about a second pivotal axis, a phantom line extending through said first pivotal axis and said second pivotal axis being tilted to one side of a vertical line when said movable section is in said first transverse position, said phantom line being tilted to an opposite side of said vertical line when said movable section is in said second transverse position; and a second pivotal link extending upwardly, disposed outwardly with respect to said first pivotal link and disposed between said fixed section and said movable section for movably supporting said movable section with respect to said fixed section in cooperation with said first pivotal link.

8. A front derailleur as defined in claim 7 wherein a first end of said first pivotal link is pivotably connected to said fixed section, wherein a second end of said first pivotal link is pivotably connected to said movable section, wherein a first end of said second pivotal link is pivotably connected to said fixed section, and wherein a second end of said second pivotal link is pivotably connected to said movable section.

9. A front derailleur as defined in claim 7 wherein said chain guide is positioned above said fixed section.

10. A front derailleur as defined in claim 7, wherein a tilt angle of said phantom line with respect to said vertical line when said movable section is in said first transverse position is greater than a tilt angle of said phantom line when said movable section is in said second transverse position.

11. A front derailleur as defined in claim 7, wherein said first and second pivotal axes are parallel to each other, and said first and second pivotal axes are positioned for overlapping with said bicycle frame viewed along said first and second pivotal axes.

12. A front derailleur as defined in claim 7, wherein said movable section includes an adjusting screw for adjusting a stroke end of said movable section with respect to said fixed section, one of said first and second movable links having a contact portion for contacting said adjusting screw.

13. A front derailleur apparatus attachable to a frame of a bicycle for shifting a chain between a small sprocket and a large sprocket comprising:

a fixed section for attaching said front derailleur to said frame;

a movable section positioned above said fixed section for moving between a low speed position and a high speed position with respect to said fixed section;

a chain guide attached to said movable section for contacting said chain to shift said chain;

a first pivotal link extending upwardly and disposed between said fixed section and said movable section for movably supporting said movable section with respect to said fixed section, said first pivotal link being supported to said fixed section to pivot about a first pivotal axis, said first pivotal link being supported to said movable section to pivot about a second pivotal axis, a phantom line extending through said first pivotal axis and said second pivotal axis being tilted to one side of a vertical line when said movable section is in said low speed position, said phantom line being tilted to an opposite side of said vertical line when said movable section is in said high speed position; and a second pivotal link extending upwardly, disposed outwardly with respect to said first pivotal link and disposed between said fixed section and said movable section for movably supporting said movable section with respect to said fixed section in cooperation with said first pivotal link.

14. A front derailleur as defined in claim 13, wherein a first end of said first pivotal link is pivotably connected to said fixed section, wherein a second end of said first pivotal link is pivotably connected to said movable section, wherein a first end of said second pivotal link is pivotably connected to said fixed section, and wherein a second end of said second pivotal link is pivotably connected to said movable section.

15. A front derailleur as defined in claim 13, wherein said chain guide is positioned above said fixed section.

16. A front derailleur as defined in claim 13, wherein a tilt angle of said phantom line with respect to said vertical line when said movable section is in said low speed position is greater than a tilt angle of said phantom line when said movable section is in said high speed position.

17. A front derailleur as defined in claim 13, wherein said first and second pivotal axes are parallel to each other, and said first and second pivotal axes are positioned for overlapping with said bicycle frame viewed along said first and second pivotal axes.

18. A front derailleur as defined in claim 13, wherein said movable section includes an adjusting screw for adjusting a stroke end of said movable section with respect to said fixed section, one of said first and second movable links having a contact portion for contacting said adjusting screw.

* * * * *